(12) United States Patent
Nakata

(10) Patent No.: US 6,871,018 B2
(45) Date of Patent: Mar. 22, 2005

(54) FOCUS DETECTION DEVICE

(75) Inventor: Masahiro Nakata, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/778,076

(22) Filed: Feb. 17, 2004

(65) Prior Publication Data

US 2004/0165878 A1 Aug. 26, 2004

(30) Foreign Application Priority Data

Feb. 18, 2003 (JP) ........................................ 2003-040205

(51) Int. Cl.[7] .............................................. G03B 13/36
(52) U.S. Cl. ........................................... 396/96; 396/99
(58) Field of Search .................. 396/96, 99; 250/201.2; 348/297–299

(56) References Cited

U.S. PATENT DOCUMENTS

| | | | | |
|---|---|---|---|---|
| 5,126,777 A | * | 6/1992 | Akashi et al. ................. | 396/99 |
| 5,652,925 A | * | 7/1997 | Aoyagi et al. ................. | 396/96 |
| 5,845,155 A | * | 12/1998 | Nakata et al. ................. | 396/96 |
| 5,943,514 A | * | 8/1999 | Sato et al. ..................... | 396/96 |
| 6,198,506 B1 | | 3/2001 | Nakata et al. ............... | 348/222 |
| 6,614,476 B1 | | 9/2003 | Sato et al. .................... | 348/294 |
| 6,657,669 B1 | * | 12/2003 | Sato et al. .................... | 348/350 |

* cited by examiner

Primary Examiner—W. B. Perkey
(74) Attorney, Agent, or Firm—Greenblum & Bernstein, P.L.C.

(57) ABSTRACT

A focus detection device includes line sensors which photoelectrically convert and integrate light from an object and output an image signal; monitor sensors, provided adjacent to the line sensors, which monitor an integrated value of the adjacent line sensors; a control device which amplifies an output of each monitor sensor and outputs a monitor signal, and terminates integration of the line sensor corresponding to the monitor sensor when the monitor signal reaches a predetermined termination value; and a gain adjustment device which adjusts a gain level of the control device in accordance with each integration time during integration of the line sensor. The gain adjustment device adjusts the gain level of the control device so that an appropriate integrated value of the line sensor becomes an approximately predetermined value when the monitor signal reaches the predetermined termination value regardless of the integration time.

9 Claims, 15 Drawing Sheets

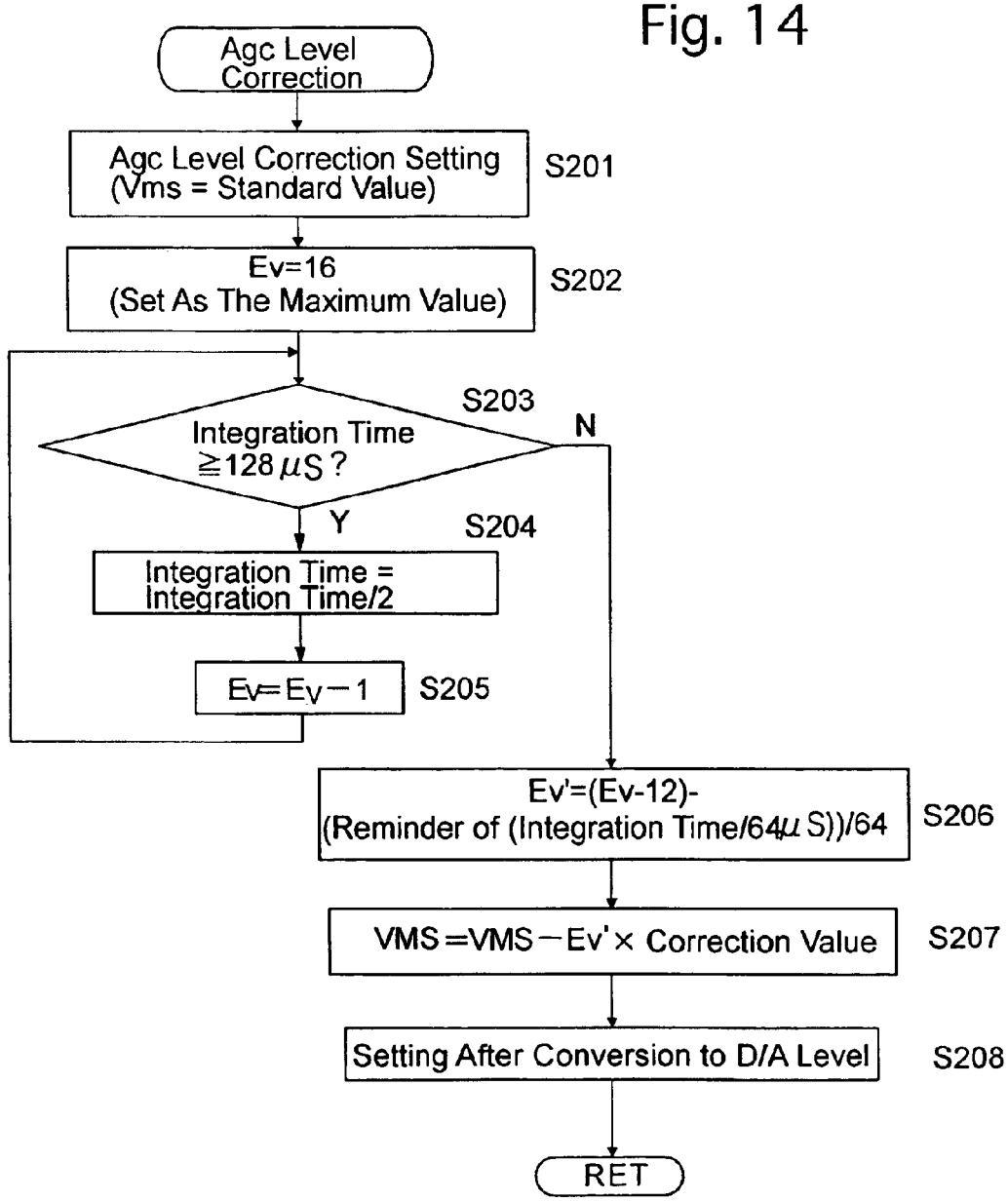

Without Correction

With Correction

FOCUS DETECTION DEVICE

BACKGROUND OF THE INVENTION

1. Field of the Invention

The present invention relates to a focus detection device suitable for a focus detection apparatus of a camera.

2. Description of the Related Art

A focus detection apparatus equipped with a phase difference CCD focus detection device is provided for a conventional AF single-lens reflex camera. The CCD focus detection device includes line sensors and monitor sensors corresponding with a photographic optical system and focus detection areas. Each of the monitor sensors receives light from a photographic subject (object) in approximately the same area as that of the adjacent CCD line sensor to output a monitor signal in accordance with the amount of received light. Thereafter, the monitor signal is amplified in an auto gain controller. When the amplified monitor signal reaches a predetermined integration termination value, the integration for the corresponding CCD line sensor is terminated.

However, it has been discovered that the integrated value of the CCD line sensor and the monitor output of the monitor sensor are not linearly proportional to each other. Specifically, the CCD focus detection device is proven to have a characteristic that, as the integration time is prolonged (the brightness of a photographic subject becomes lower), an appropriate integrated value of the CCD line sensor is decreased as compared with the monitor signal of the monitor sensor. Therefore, in the case of high brightness, the integrated value of a high-brightness portion of the CCD line sensor exceeds a saturated integrated value, preventing accurate phase difference measurement. On the other hand, in the case of low brightness, the integrated value becomes smaller than the appropriate integrated value, preventing efficient use of a dynamic range of the CCD line sensor. As a result, a contrast cannot be obtained. As described above, in the focus detection device using the conventional CCD line sensors, the output of the CCD line sensor sometimes becomes non-uniform depending on the brightness of the object, preventing accurate measurement.

SUMMARY OF THE INVENTION

The present invention is devised in view of the above-described conventional problem, and provides a focus detection device including CCD line sensors, capable of keeping an appropriate integrated value of the CCD line sensor at an approximately constant value regardless of the brightness of a photographic subject.

According to an aspect of the present invention, a focus detection device is provided, including a plurality of line sensors, each having a plurality of pixels, wherein each of the line sensors photoelectrically converts and integrates light from an object received by each of the pixels so as to output the received light as an image signal; a plurality of monitor sensors provided adjacent to the line sensors, respectively, each of the monitor sensors monitoring an integrated value of the adjacent line sensor; a control device which amplifies an output of each of the monitor sensors and outputs the amplified output as a monitor signal, and terminates integration of the line sensor corresponding to the monitor sensor when the monitor signal reaches a predetermined termination value; and a gain adjustment device which adjusts a gain level of the control device in accordance with each integration time during integration of the line sensor. The gain adjustment device adjusts the gain level of the control device so that an appropriate integrated value of the line sensor becomes an approximately predetermined value when the monitor signal reaches the predetermined termination value regardless of the integration time. According to this structure, the appropriate integrated value of the line sensor can be kept approximately constant regardless of the brightness of a photographic subject and the integration time. Therefore, an effective dynamic range of the line sensor can be efficiently used regardless of the brightness of a photographic subject.

It is desirable for the gain adjustment device to include a calculation device which uses integration time obtained by performing logarithmic compression on the integration time and a predetermined factor to calculate a gain-level adjustment value.

The focus detection device can include a detection device which detects that the amplified monitor signal reaches the predetermined termination value allowing the integration of the line sensor to be terminated after the control device allows the line sensor and the monitor sensor to start the integration.

It is desirable for the control device to output a first termination signal from a first control output terminal to the gain adjustment device when the detection device detects that the monitor signal of any of the monitor sensors reaches the termination value, and thereafter sequentially outputs integration termination information of the respective monitor sensors from the first control output terminal to the gain adjustment device.

The gain adjustment device can measure the integration time based on the integration termination information so as to calculate the gain-level adjustment value.

The gain adjustment device can measure the integration time based on the integration termination information output from the first control output terminal.

It is desirable for the focus detection device to include the line sensors, the monitor sensors and the control device, wherein the gain adjustment device is provided separately from the focus detection device.

It is desirable for the gain adjustment device to include a control device of a focus detection apparatus, wherein the focus detection device is provided in the focus detection apparatus. It is desirable for the focus detection device to be provided in a camera, wherein a control device of the camera functions as the gain adjustment device.

The present disclosure relates to subject matter contained in Japanese Patent Application No. 2003-40205 (filed on Feb. 18, 2003) which is expressly incorporated herein by reference in its entirety.

BRIEF DESCRIPTION OF THE DRAWINGS

FIG. 14 is a flowchart showing an AGC level correction process of the CCD focus detection device, according to the present invention;

DETAILED DESCRIPTION OF THE PREFERRED EMBODIMENTS

Figure 1:
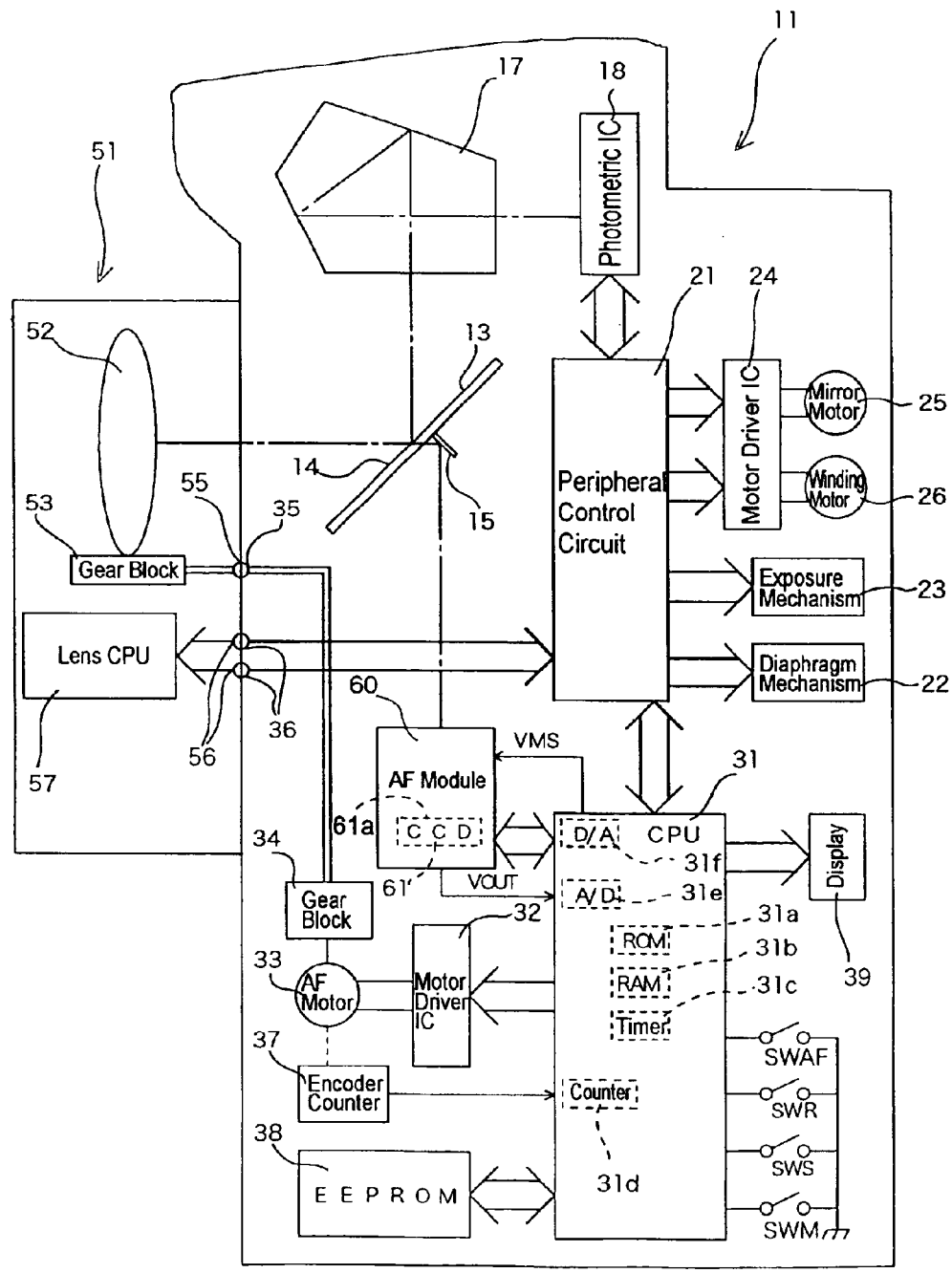
FIG. 1 is a schematic block diagram showing a single-lens reflex camera equipped with a CCD focus detection device, according to the present invention.

The embodiments of the present invention will be described with reference to the accompanying drawings. FIG. 1 is a schematic block diagram showing a single-lens reflex camera equipped with a CCD focus detection device according to the present invention.

The AF single-lens reflex camera includes a camera body 11 including an AF sensor module (focus detecting module) 60 equipped with a CCD focus detection device 61 as an element for focus detection; and a photographic lens (AF lens) 51 which is detachably attached to the camera body 11. The camera body 11 includes a main CPU 31 for collectively controlling the camera body 11 and the photographic lens 51.

The major portion of an object light bundle, which enters the camera body 11 from the photographic lens 51, is reflected by a main mirror 13 toward a penta prism (finder optical system) 17. The reflected light bundle is reflected again by the penta prism 17 to exit from an eyepiece (not shown). A portion of the object light bundle (exiting from the penta prism 17) is incident on a light-receiving element of a photometering IC 18. On the other hand, a portion of the object light bundle, which is incident on a half mirror portion 14 provided in the center of the main mirror 13, transmits through the half mirror portion 14 and thereafter is reflected downward by a sub-mirror 15 provided on the back face of the main mirror 13 to enter the AF sensor module 60.

The photometering IC 18 inputs an electric signal, which is photoelectrically converted in accordance with the quantity of received light, to the main CPU 31 via a peripheral control circuit 21 as a photometering signal. The main CPU 31 performs a predetermined exposure operation based on the photometering signal, film (ISO) sensitivity (film speed) information, and the like, to calculate an appropriate shutter speed and f-number for exposure. Thereafter, a diaphragm mechanism 22 and an exposure mechanism 23 are driven based on the calculated shutter speed and f-number to perform an exposure operation on a film. Furthermore, during a photographing operation, the peripheral control circuit 21 drives a mirror motor 25 via a motor drive circuit (motor drive IC) 24 to lift the main mirror 13 upwards. After the completion of the exposure operation, the peripheral control circuit 21 drives the mirror motor 25 to let the main mirror 13 down, and then drives a film winding motor 26 to wind the film by one frame.

The AF sensor module 60 is driven by a pupil-division phase difference system. The AF sensor module 60 includes the CCD focus detection device 61 having a plurality of CCD line sensors I, and an AF optical system (not shown). The AF optical system performs pupil-division on an object light bundle, which forms an object image within a plurality of focus detection areas, to divide the object light bundle into two light bundles on a focus detection plane which is provided optically equivalent to an image pickup plane. Subsequently, the AF optical system projects the light bundles onto the corresponding CCD line sensors I. The CCD focus detection device 61 includes: the plurality of line sensors I for respectively receiving and integrating a pair of split-pupil object light bundles; and monitor sensors M, each for monitoring the quantity of light received by each line sensor I, i.e., for checking the integrated values sensed by the line sensors I. The driving of each of the line sensors I and each of the monitor sensors M is controlled by a control circuit system 81 (shown in FIG. 3) provided in the CCD focus detection device 61. When a monitor voltage (output voltage) of the monitor sensor M reaches a predetermined threshold value, the control circuit system 81 terminates the integration for the line sensor I corresponding to the monitor sensor M. When the integration for all the line sensors I is terminated, charges integrated by the line sensors I are each converted into voltages which are output to the main CPU 31 as a video signal in pixel units.

The main CPU 31 calculates the amount of defocus by a predetermined calculation based on an image signal input from the AF sensor module 60 (the CCD focus detection device 61). Subsequently, based on the calculated amount of defocus, the main CPU 31 determines a direction of rotation and the number of revolutions (the number of pulses output from an encoder 37) of an AF motor 33 for driving a lens group 52 of the photographic lens 51. Accordingly, based on the rotational direction and the number of pulses determined by the main CPU 31, the main CPU 31 drives the AF motor 33 via the AF motor driver 32. Upon driving the AF motor 33, the main CPU 31 operates simultaneously with the rotation of the AF motor 33 to count the pulses output from the encoder 37 by a counter 31d. When a counted value reaches the above-mentioned number of pulses, the main CPU 31 stops the operation of the AF motor 33.

The photographic lens 51 includes a lens CPU 57, a gear block 53 for driving the lens group 52 for focus adjustment in an optical axis direction, and a lens joint 55 which is removably connected to a body joint 35 of the camera body 11. The lens joint 55 and the body joint 35 are each provided a mount portion of the photographic lens 51 and on a mount portion of the camera body 11, respectively. Rotation of the AF motor 33 is transmitted to the gear block 53 via the gear block 34 and the body and lens joints 35 and 55, so as to move the lens group 52 backwards and forwards to carry out a focus adjustment via the gear block 53.

The main CPU 31 includes a ROM 31a for storing a control program, and the like, a RAM 31b for temporarily storing predetermined data for calculation and for control, a timer 31c and a counter 31d for time measurement, an A/D converter 31e for performing A/D conversion on a VOUT signal (image signal/video signal) input from the AF sensor module 60 (the CCD focus detection device 61), and a D/A converter 31f for performing D/A conversion on a VMS signal and outputting a converted VMS signal. An EEPROM (memory) 38 is connected to the main CPU 31 as an external memory. The EEPROM 38 stores various constants specifically for use for components provided in the camera body 11, selection mode data for the monitor sensors M and the line sensors I used by the CCD focus detection device 61, and the like.

Furthermore, a main switch SWM, an autofocus switch SWAF, a photometering switch SWS, and a release switch SWR are also connected to the main CPU 31. The main switch SWM is for turning a power source ON and OFF. The autofocus switch SWAF is for switching between autofocus control and manual focus control. The photometering switch SWS is turned ON while a release button is being pressed halfway down or completely down. The release switch SWR is turned ON when the release button is pressed completely down.

When the photometering switch SWS is turned ON, the main CPU 31 activates the photometering IC 18 via the peripheral control circuit 21 to measure the brightness of the object so as to perform an exposure calculation. At the same time, the main CPU 31 activates the AF sensor module 60 so that an integration signal is input from a predetermined line sensor to calculate the amount of defocus. Thereafter, the main CUP 31 calculates the amount the lens group is to be driven, based on the amount of defocus, whereby the AF motor 33 is driven by the calculated amount of driving of the lens group.

The main CPU 31 displays set modes such as an AF mode, exposure mode, photographing mode, shutter speed mode and f-number mode, and the like, on a display 39. The display 39 normally includes display panels provided at two positions, i.e., on an outer face of the camera body 11 and within a field of view of a finder.

The lens CPU 57 is connected to the peripheral control circuit 21 of the camera body 11 via electrical contact point groups 56 and 36. The lens CPU 57 performs predetermined data communication with the main CPU 31 via the peripheral control circuit 21 for data such as aperture f-number and the maximum f-number information, focal distance information, lens position (distance) information, and the like.

Figure 2:
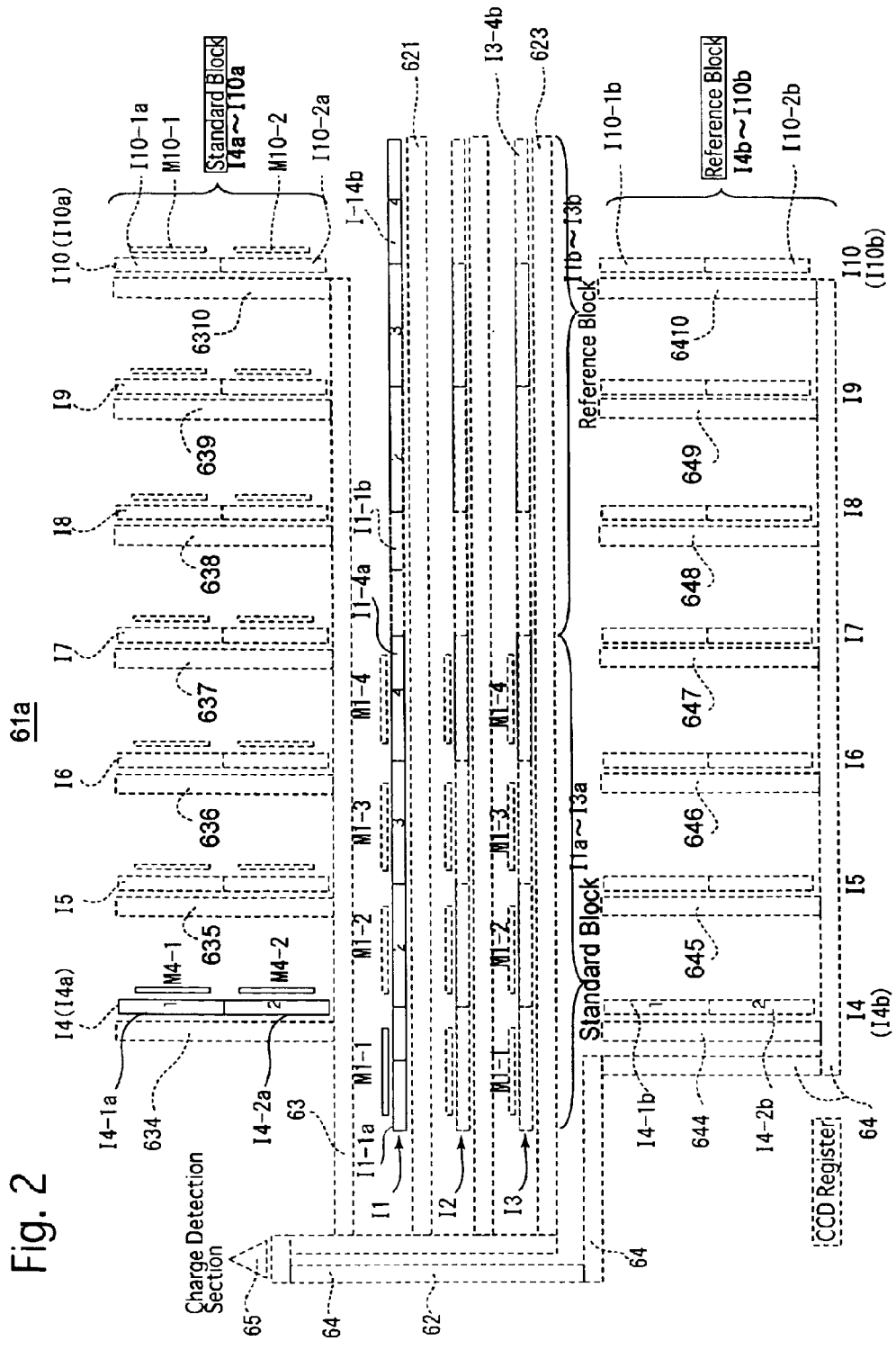
FIG. 2 is a view showing an embodiment of arrangement of line sensors in the CCD focus detection device, according to the present invention.

The CCD focus detection device 61 provided for the above-described single-lens reflex camera will now be described in detail with reference to FIG. 2. FIG. 2 is a diagram showing an embodiment of the arrangement of the line sensors I and the monitor sensors M on a light-receiving surface 61a of the CCD focus detection device 61. In the illustrated embodiment, the line sensors I and the monitor sensors M, which are used in an AF operation, are provided as a plurality of selection modes. In an actual AF operation, a selection mode which is appropriate for the AF optical system is selected, and the driving of the selected line sensors I and monitor sensors M are controlled by the control circuit (control device) 71 of the CCD focus detection device 61. Accordingly, a construction can be provided wherein an appropriate selection mode for the AF optical system is selected, and the driving of the line sensors I and the monitors M which are included in such a mode selection can be controlled by the control circuit 71 of the CCD focus detection device 61. The CCD focus detection device 61 of the present invention is distinctive in that each device, which includes the line sensors I, the monitors M, and the control circuit 71, is formed on a substrate 80.

In the center of the light-receiving surface 61a, three horizontal line sensors I1, I2 and I3 are provided in parallel to each other arranged in a top-to-bottom fashion at predetermined intervals and extend horizontally. Seven longitudinal line sensors I4 to I10 are provided in parallel to each other in a left-to-right fashion at predetermined intervals. Each of the longitudinal line sensors I4 to I10 longitudinally extends on each side of the horizontal line sensors I1 to I3. The line sensors in the illustrated embodiment are so-called CCD line sensors. Namely, each of the line sensors I1 through I10 of the illustrated embodiment is provided with multiple photoelectric-converting elements/photoelectric transducers (photo diodes) which extend in a longitudinal direction.

A portion of the horizontal line sensors I1 to I3, which is situated in the left half of the light-receiving surface 61a from the center thereof, is designated as a standard block (standard line sensors I1a to I3a) corresponding to a standard area, whereas the remaining portion of the horizontal line sensors I1 to I3, which is situated in the right half of the light-receiving surface 61a, is designated as a reference block (reference line sensors I1b to I3b) corresponding to a reference area.

Each of the standard line sensors I1a to I3a of the respective horizontal line sensors I1 to I3 is further designated with four standard areas (sub-areas) (I1-1a to I1-4a) to (I3-1a to I3-4a), whereas each of the reference line sensors I1b to I3b is further designated with four reference areas (sub-areas) (I1-1b to I1-4b) to (I3-1b to I3-4b). The monitor sensors (M1-1, M1-2, M1-3, M1-4) to (M3-1, M3-2, M3-3, M3-4) are provided so as to be adjacent to the respective standard areas (I1-1a to I1-4a) to (I3-1a to I3-4a) of the standard line sensors I1a to I4a.

Each of the monitor sensors (M1-1 to M1-4) to (M3-1 to M3-4) operates independently so as to monitor the quantity of received light in each of the adjacent standard areas (I1-1a to I1-4a) to (I3-1a to I3-4a) of the standard line sensors I1a to I3a.

A portion of the longitudinal line sensors I4 to I10, which is situated above the horizontal line sensors I1 to I3, is designated as a standard block (standard line sensors I4a to I10a), whereas the remaining portion of the longitudinal line sensors I4 to I10, which is situated below the horizontal line sensors I1 to I3, is designated as a reference block (reference line sensors I4b to I10b). Each of the standard line sensors I4a to I10a of the respective longitudinal line sensors I4 to I10 is designated as two standard areas (I4-1a, I4-2a) to (I10-1a, I10-2a) which are obtained by longitudinally dividing each of the standard line sensors I4a to I10a in two, whereas each of the reference line sensors I4b to I10b is designated as two reference areas (I4-1b, I4-2b) to (I10-1b, I10-2b) which are obtained by longitudinally dividing each of the reference line sensors I4b to I10b in two. The monitor sensors (M4-1, M4-2) to (M10-1, M10-2) are provided so as to be adjacent to the respective standard areas (I4-1a, I4-2a) to (I10-1a, I10-2a) of the standard line sensors I4a to I10a.

Each of the monitor sensors (M4-1 to M4-2) to (M10-1 to M10-2) operates independently so as to monitor the quantity of received light in each of the adjacent standard areas (I4-1a to I4-2a) to (I10-1a to I10-2a) of the standard line sensors I4a to I10a.

Each of the line sensors I1 to I10 is used so that one of the pair of object light bundles from the object, obtained by pupil-division for a plurality of ranging zones, is received by the standard line sensors I1a to I10a and the other light bundle of the pair of object light bundles is received by the reference line sensors I1b to I10b.

Furthermore, the CCD focus detection device 61 includes shift registers 62, 63, 64, 621 to 623, 634 to 6310, and 644 to 6410. The shift registers 62, 63, 64, 621 to 623, 634 to 6310, and 644 to 6410 are arranged in parallel to the line sensors I1 to I10 so as to be adjacent to the line sensors on the side opposite to where the monitor sensors M are provided. The charges accumulated in each of the line sensors I1 to I10 are transferred as the unit of each of the line sensors I1, I2, I3 and I4 to I10. The charges accumulate in each of the line sensors I1 to I10 are stored in an ST (Storage) section (not shown) for each of the line sensors I1 to I10 at the end of integration.

When the integration for all the line sensors I1 to I10 is completed, the charges therefrom are serially read from a charge detection section 65 via the shift registers 62, 63 and 64. The shift register 62 is directly connected to the charge detection section 65, whereas the shift register 63 is first combined with the shift register 62 so as to be connected to the charge detection section 65.

In the illustrated embodiment, the charges in the standard line sensors I4a to I10a of the longitudinal line sensor I4 to I10 are transferred by the shift register 63 to the charge detection section 65, whereas the charges in the reference line sensors I4b to I10b are transferred to the charge detection section 65 by the shift register 64.

Figure 3:
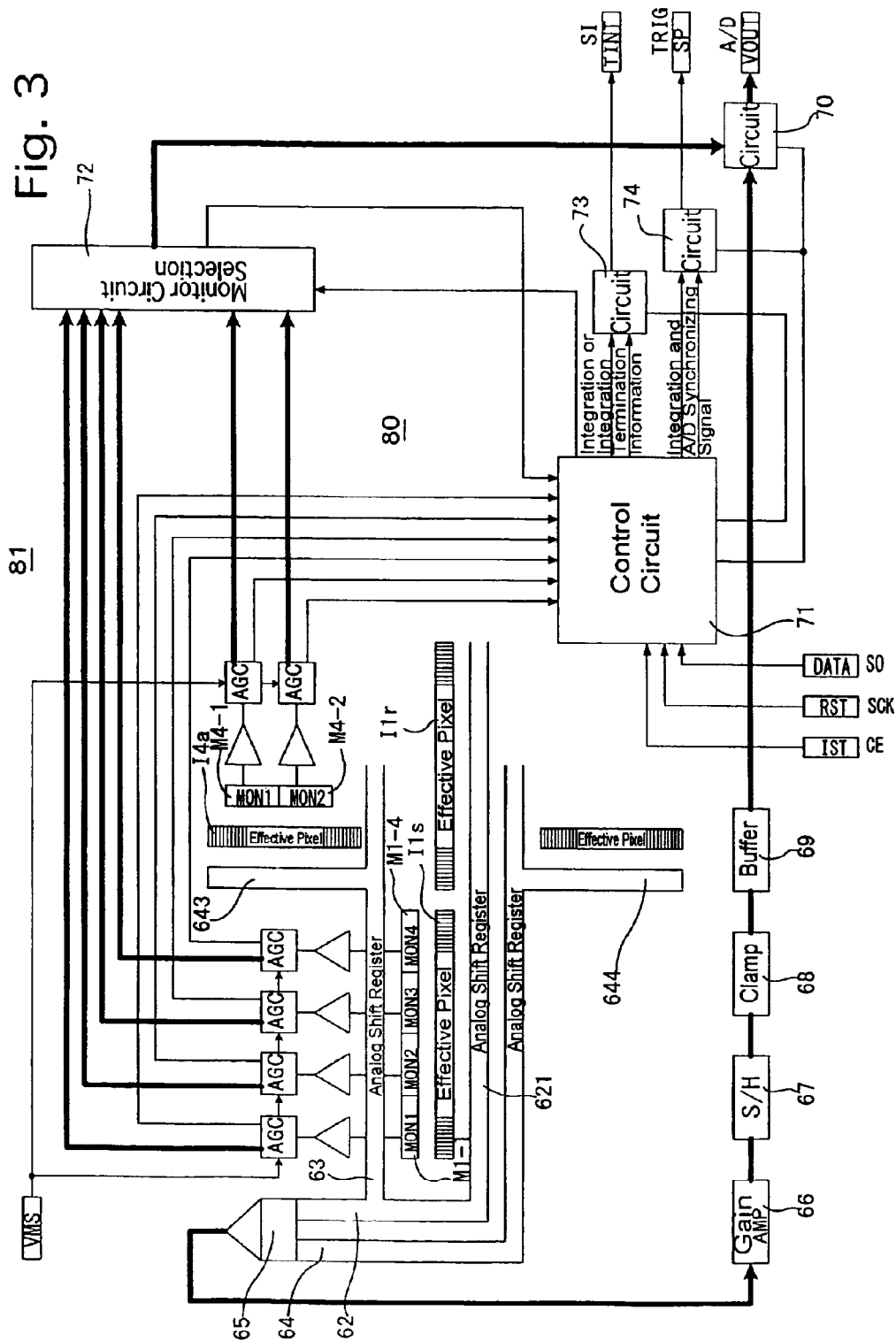
FIG. 3 is a schematic block diagram showing a control circuit for the CCD focus detection device, according to the present invention.

FIG. 3 is a block diagram showing a principal portion of the control circuit system 81 formed on the substrate 80 of the CCD focus detection device 61. The operation of the CCD focus detection device 61 is controlled by the control circuit 71. A characteristic of the CCD focus detection device 61 is that the line sensors I and the monitor sensors M to be used are selectable by the control circuit system 81. The main CPU 31 directs the control circuit 71 to operate. In the CCD focus detection device 61 according to the illustrated embodiment, the line sensors I and the monitor sensors M, which are designated by a command from the main CPU 31, are selected and controlled by the control circuit 71.

The configuration of the CCD focus detection device 61 will now be described. Since the basic operations of each of the line sensors I and each of the monitor sensors M are the same, the specific operations of the line sensors I and the monitor sensors M will be representatively described for the line sensor I1 (I1-1 to I1-4) and the corresponding monitor sensor M1 (M1-1 to M1-4).

Immediately before the initiation of integration, the control circuit 71 performs a sweep-drive on the line sensor I1 to sweep the charges accumulated in each pixel (photodiode) away so as to initiate the integration (charge accumulation) in pixel units. Simultaneously, the monitor sensors M1-1 to M1-4 are cleared so as to start monitoring the amount of integration. An output voltage of each of the monitor sensors M controls the amount of integration time by each auto gain controller AGC via a buffer. Each of the auto gain controllers AGC is controlled by a VMS signal output from the main CPU 31.

A monitor signal output from each of the auto gain controllers AGC is input to the control circuit 71 and a monitor selection circuit 72. The control circuit 71 includes stored logic (for example, operational amplifiers) serving as a detection device for detecting that each monitor signal reaches a predetermined integration termination threshold value (integration termination value). When an output of any of the logic changes, the control circuit 71 outputs an integration OR signal (a first termination signal) to a port TINT via a selection circuit 73. Based on the signal output to the port TINT, the main CPU 31 detects whether the integration of any of the line sensors I has terminated. In the illustrated embodiment, the control circuit 71 drops the level of the integration OR signal output to the selection circuit 73 from a high level to a low level when the level of any of the logic drops from high to low. The integration OR signal is at a high level at the start of integration.

The control circuit 71 terminates the integration of the line sensor I corresponding to the monitor sensor M when the output of the logic changes, i.e., the monitor signal reaches a predetermined threshold value. The accumulation of charges in the ST section from the corresponding line sensors I1 to I10 is also terminated due to the termination process of the integration.

Moreover, the monitor signals from the monitor sensor M, which are input to the monitor selection circuit 72, are output to the output selection circuit 70 one by one so as to be subsequently output from a port VOUT via the output selection circuit 70.

The main CPU 31 outputs a DATA signal for specifying the monitor sensor M to the CCD focus detection device 61. The control circuit 71 of the CCD focus detection device 61 selects the monitor signal of the monitor sensor M, which is specified by the main CPU 31, by the monitor selection circuit 72. The control circuit 71 outputs the selected monitor signal as a VOUT signal to the main CPU 31 via the output selection circuit 70. Simultaneously, the control circuit 71 outputs an integration AND signal from a port SP via the selection circuit 74. The integration AND signal is input from a port TRIG to the main CPU 31 where the monitor signal is subjected to A/D conversion until the level of the monitor signal is brought to an "L" level.

The main CPU 31 performs A/D conversion on the input monitor signal of the monitor sensor M so as to use the A/D-converted signal for integration time prediction and gain setting.

In the CCD focus detection device 61 in the illustrated embodiment, after the initiation of integration, the monitor signal from the monitor selection circuit 72 is alternatively output from the output selection circuit 70 as a VOUT signal. Whether all of the monitor signals of all the monitor sensors M reaching a predetermined threshold value occurs the soonest, or whether the elapsing of a predetermined amount of time (maximum integration time) occurs the soonest, i.e., after the completion of integration for all the CCD line sensors I or the forced completion of integration, image signals (Video signals) read from the CCD line sensors I are subsequently output via the output selection circuit 70 from a port VOUT as VOUT signals.

When the control circuit 71 detects that the monitor signals of all the monitor sensors M have reached a threshold value within a predetermined period of time, the control circuit 71 outputs an integration AND signal (a second termination signal) via the selection circuit 74 from the port SP to the main CPU 31. If a predetermined amount of time has elapsed before the monitor signals of all the monitor sensors M reach the threshold value, the control circuit 71 terminates the integration for the line sensors I corresponding to all the monitor sensors M whose monitor signals have not reached the threshold value. Thereafter, the control circuit 71 outputs the integration AND signal (the second termination signal) via the selection circuit 74 from the port SP to the main CPU 31.

When the integration for all the line sensors I is terminated, for each of the line sensors I1 to I10, the charges are sequentially transferred in each of the units of the line sensors I1, I2, I3 and I4 to I10 and their pixels via the shift registers 62, 63 and 64 to be converted into voltage signals in the charge detecting section 65 to be output.

After the voltage signal in the form of charge units is amplified in an amplifier (Gain AMP) 66, an OB voltage is clamped by a sample hold circuit (S/H) 67 and a clamp circuit 68. Thereafter, the OB voltage is output from a buffer 69 via the output selection circuit 70 through a port VOUT as a VOUT signal (video signal). The VOUT signal is input from a port A/D to the main CPU 31. The main CPU 31 converts the input VOUT signal into a digital signal in the form of pixel units by the included A/D converter 31e. Thereafter, the digital signals are sequentially stored in the included RAM 31b.

The above-described monitoring, an integration and reading-out process can be carried out for all the monitor sensors M and the line sensors I. In the illustrated embodiment, however, a set of the line sensor I and the monitor sensor M, on which the above process is performed, can be arbitrarily selected and combined. More specifically, the monitoring, integration and reading-out processes can be carried out only for the set of the combined line sensor I and monitor sensor M. Furthermore, monitoring, integration and reading-out processes can be carried out on a desired line sensor I or monitor sensor M from any line sensor I or monitor sensor M included in the selection mode.

Figure 4:
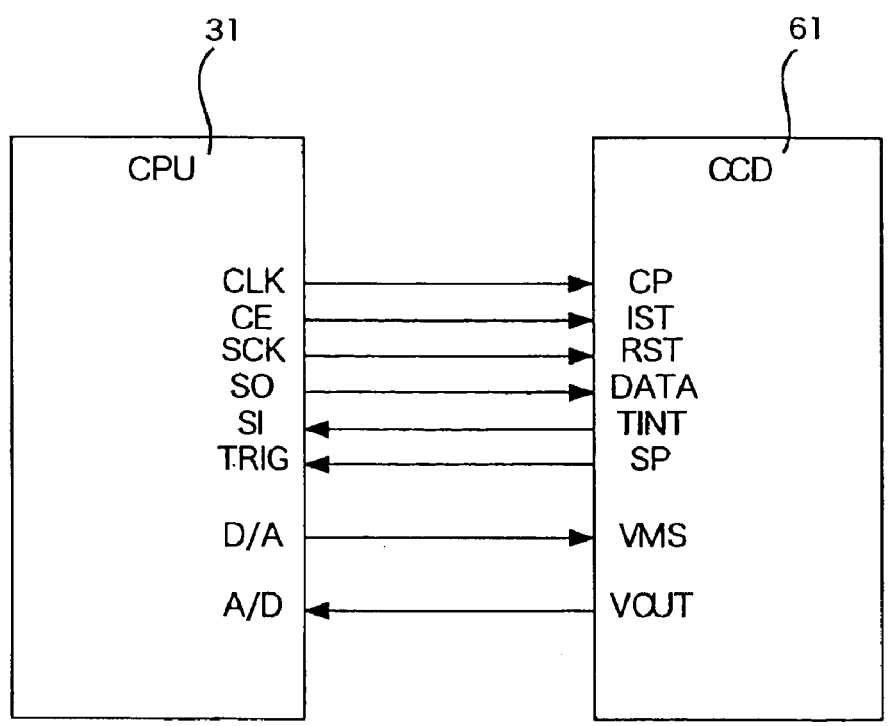
FIG. 4 is a diagram showing communication lines between the CCD focus detection device, according to the present invention and a CPU of the camera.

FIG. 4 shows the relationship between the ports of the main CPU 31, the ports of the CCD focus detection device 61, and signals transmitted and received therebetween. The signals are transmitted in the directions indicated with arrows.

|  | Main CPU 31 | CCD Focus Detection Device 61 |
| --- | --- | --- |
| Chip Enable Signal | CE | IST |
| Serial Clock | SCK | RST |
| Data Signal | SO | DATA |

|  | Main CPU 31 | CCD Focus Detection Device 61 |
| --- | --- | --- |
| Gain Setting Signal | D/A | VMS |

| Main CPU 31 | CCD Focus Detection Device 61 |
| --- | --- |
| SI | TINT Integration OR Signal/ Integration Termination Info. (First Control Terminal) |

The integration OR signal is at a high level during integration.

At the end of integration of any of the monitor sensors M, the level of integration OR signal drops from high to low so that the selection circuit 73 is switched so as to output integration termination information. Thereafter, the main CPU 31 checks the integration termination information of the other monitor sensors M so as to measure the amount of integration time of the other monitor sensors M. In other words, the switching to the integration termination information occurs when the integration termination information is output from the port TINT.

| Main CPU 31 | CCD Focus Detection Device 61 |
| --- | --- |
| TRIG | SP Integration AND Signal/A/D Synchronizing Signal (Second Control Terminal) |

The integration AND (all integration termination) signal is at a high level during integration.

At the end of integration for all the monitor sensors M, the level of integration AND signal drops from high to low so that the selection circuit 74 is switched to output an A/D synchronizing signal.

| Main CPU 31 | CCD Focus Detection Device 61 |
| --- | --- |
| A/D | VOUT Line Sensor Image Signal |

The operations of the main CPU 31 and the CCD focus detection device 61 will be described with reference to timing charts shown in FIGS. 5 to 7.

Figure 5:
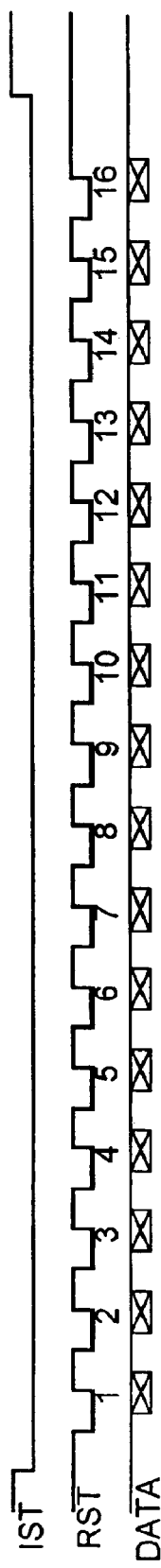
FIG. 5 is a timing chart showing the communication setting content of the CCD focus detection device according to the present invention.
Figure 6:
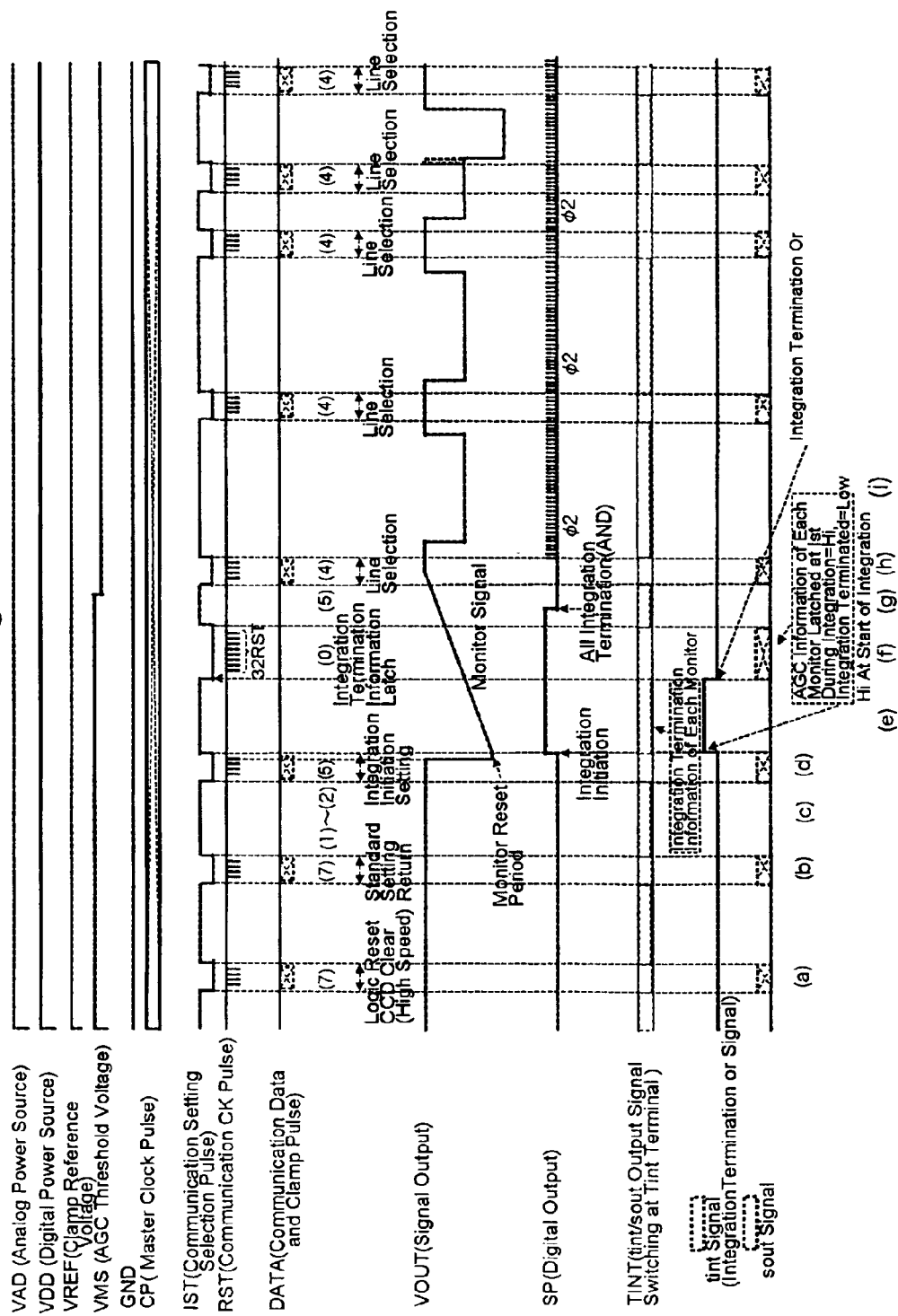
FIG. 6 is a timing chart showing the entire operation of the CCD focus detection device, according to the present invention.

FIG. 5 is a timing chart showing the communication setting between the main CPU 31 and the control circuit 71 where the main CPU 31 communicates with the control circuit 71.

When the main CPU 31 starts communication, the main CPU 31 lets the port CE fall so as to output the chip enable signal at a low level to the port IST. When the level of the port IST drops to a low level, the control circuit 71 transits to a communication state so as to maintain a communicable state during a low-level period.

Subsequently, the main CPU 31 outputs a clock pulse from the port SCK. The clock pulse is input to the port RST so that the control circuit 71 starts a communication setting process in synchronization with the input clock pulse.

Furthermore, the main CPU 31 outputs data for 16 bits from the port SO in synchronization with the clock pulse from the port SCK. The control circuit 71 inputs the data for 16 bits to the port DATA, and then sets each control parameter based on the input data for 16 bits.

Table 1 below shows an example of control codes and control parameters as exemplary contents of the data for 16 bits transmitted and received by the above-described communication setting. In this example, among 16 bits, bits 1 to 3 represent control code numbers, whereas bits 4 to 16 represent control parameters. A control code number 0 specifies integration termination information (AGC=26); control code numbers 1 and 2 specify AGC automatic termination individual disabling setting; a control code number 4 specifies reading-out line selection, a transfer rate, and gain setting; a control code number 5 specifies integration initiation/termination, AGC selection, selection of the monitor sensor M to output, and AGC automatic termination total disabling setting; and a control code number 7 specifies logic reset (default setting).

TABLE 1

| Control code | | | Control parameter | | | | | | | | | | | | | Contents |
|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | |
| 0 | 1 | 1 | | | | | | | | | | | | | | Integration termination information (AGC = 26) |
| 1 | 0 | 1 | AGC automatic termination disabling setting 1 | | | | | | | | | | | | | AGC automatic termination individual disabling setting |
| 2 | 1 | 0 | AGC automatic termination disabling setting 2 | | | | | | | | | | | | | |
| 3 | 0 | 0 | | | | | | | | | | | | | | Supplementary |
| 4 | 1 | 1 | Reading-out start | Reading-out line selection | Transfer rate | Gain setting | | | | | | | | | | Reading-out line selection, Transfer rate, Gain setting |
| 5 | 0 | 1 | Integration initiation/termination | AGC selection | | | Output monitor selection | | | | | AGC automatic termination total disabling setting | | | | Integration initiation/termination, AGC selection, Output monitor selection, AGC automatic termination total disabling setting |
| 6 | 1 | 0 | | | | | | | | | | | | | | For supplement |
| 7 | 0 | 0 | | | | | Transfer rate | | | | | | | | | Logic reset (Default setting) |

The examples of control parameters are shown in Tables 2, 3 and 4.

Table 2 shows the contents of the control code number 1. The control code number 1 indicates the AGC automatic termination disabling setting 1. The control parameters specify the monitor sensor M to be disabled among the line sensors I1 to I4-1. The monitor sensor M disabled by the control code number 1 and the corresponding line sensor I are not used. In the illustrated embodiment, the integration termination process is performed in the all integration termination operation.

TABLE 2

| Control code 1 | Control parameter | | | | | | | | | | | | | Contents of setting |
|---|---|---|---|---|---|---|---|---|---|---|---|---|---|---|
| | 4 | 5 | 6 | 7 | 8 | 9 | 10 | 11 | 12 | 13 | 14 | 15 | 16 | |
| AGC automatic termination disabling setting 1 | 1 | 1 | 1 | 1 | 1 | 1 | 1 | 1 | 1 | 1 | 1 | 1 | 0 | ISLAND 1–1 |
| | 1 | 1 | 1 | 1 | 1 | 1 | 1 | 1 | 1 | 1 | 1 | 0 | 1 | 1–2 |
| | 1 | 1 | 1 | 1 | 1 | 1 | 1 | 1 | 1 | 1 | 0 | 1 | 1 | 1–3 |
| | 1 | 1 | 1 | 1 | 1 | 1 | 1 | 1 | 1 | 0 | 1 | 1 | 1 | 1–4 |
| | 1 | 1 | 1 | 1 | 1 | 1 | 1 | 1 | 0 | 1 | 1 | 1 | 1 | 2–1 |
| | 1 | 1 | 1 | 1 | 1 | 1 | 1 | 0 | 1 | 1 | 1 | 1 | 1 | 2–2 |
| | 1 | 1 | 1 | 1 | 1 | 1 | 0 | 1 | 1 | 1 | 1 | 1 | 1 | 2–3 |
| | 1 | 1 | 1 | 1 | 1 | 0 | 1 | 1 | 1 | 1 | 1 | 1 | 1 | 2–4 |
| | 1 | 1 | 1 | 1 | 0 | 1 | 1 | 1 | 1 | 1 | 1 | 1 | 1 | 3–1 |
| | 1 | 1 | 1 | 0 | 1 | 1 | 1 | 1 | 1 | 1 | 1 | 1 | 1 | 3–2 |
| | 1 | 1 | 0 | 1 | 1 | 1 | 1 | 1 | 1 | 1 | 1 | 1 | 1 | 3–3 |
| | 1 | 0 | 1 | 1 | 1 | 1 | 1 | 1 | 1 | 1 | 1 | 1 | 1 | 3–4 |
| | 0 | 1 | 1 | 1 | 1 | 1 | 1 | 1 | 1 | 1 | 1 | 1 | 1 | 4–1 |

Table 3 shows the contents of the control code number 2. The control code number 2 indicates the AGC automatic termination disabling setting 2. The control parameters specify the monitor sensor M on which AGC automatic termination disabling is performed among the line sensors I4-2 to I10-2. Specifically, the monitor sensor M which is specified for AGC automatic termination disabling by the control parameters of the control code number 2 and the corresponding line sensor I are not used.

contents of the control parameters of bits 4 to 16. In the illustrated embodiment, the integration initiation is specify when the bit 4 is 0, whereas the integration termination is specified when the bit 4 is 1. The bits 5 to 7 specify any one of MODE (selection mode) 1 to MODE (selection mode) 5,

TABLE 3

| Control code 2 | Control parameter | | | | | | | | | | | | | Contents of setting |
|---|---|---|---|---|---|---|---|---|---|---|---|---|---|---|
| | 4 | 5 | 6 | 7 | 8 | 9 | 10 | 11 | 12 | 13 | 14 | 15 | 16 | |
| AGC automatic termination disabling setting 2 | 1 | 1 | 1 | 1 | 1 | 1 | 1 | 1 | 1 | 1 | 1 | 1 | 0 | ISLAND 4–2 |
| | 1 | 1 | 1 | 1 | 1 | 1 | 1 | 1 | 1 | 1 | 1 | 0 | 1 | 5–1 |
| | 1 | 1 | 1 | 1 | 1 | 1 | 1 | 1 | 1 | 1 | 0 | 1 | 1 | 5–2 |
| | 1 | 1 | 1 | 1 | 1 | 1 | 1 | 1 | 1 | 0 | 1 | 1 | 1 | 6–1 |
| | 1 | 1 | 1 | 1 | 1 | 1 | 1 | 1 | 0 | 1 | 1 | 1 | 1 | 6–2 |
| | 1 | 1 | 1 | 1 | 1 | 1 | 1 | 0 | 1 | 1 | 1 | 1 | 1 | 7–1 |
| | 1 | 1 | 1 | 1 | 1 | 1 | 0 | 1 | 1 | 1 | 1 | 1 | 1 | 7–2 |
| | 1 | 1 | 1 | 1 | 1 | 0 | 1 | 1 | 1 | 1 | 1 | 1 | 1 | 8–1 |
| | 1 | 1 | 1 | 1 | 0 | 1 | 1 | 1 | 1 | 1 | 1 | 1 | 1 | 8–2 |
| | 1 | 1 | 1 | 0 | 1 | 1 | 1 | 1 | 1 | 1 | 1 | 1 | 1 | 9–1 |
| | 1 | 1 | 0 | 1 | 1 | 1 | 1 | 1 | 1 | 1 | 1 | 1 | 1 | 9–2 |
| | 1 | 0 | 1 | 1 | 1 | 1 | 1 | 1 | 1 | 1 | 1 | 1 | 1 | 10–1 |
| | 0 | 1 | 1 | 1 | 1 | 1 | 1 | 1 | 1 | 1 | 1 | 1 | 1 | 10–2 |

Table 4 shows the contents of the control code number 5. The control code number 5 specifies integration initiation/termination, AGC selection, output monitor selection or AGC automatic termination total disabling based on the the bits 8 to 12 specify a VREF output, any one of the line sensors I1-1 to I10-2, and any one of AGC black outputs, and the bit 13 specifies AGC automatic termination total disabling.

TABLE 4

| Control code 5 | Control parameter | | | | | | | | | | | | | Contents of setting |
|---|---|---|---|---|---|---|---|---|---|---|---|---|---|---|
| | 4 | 5 | 6 | 7 | 8 | 9 | 10 | 11 | 12 | 13 | 14 | 15 | 16 | |
| Integration initiation/termination | 1 | | | | | | | | | | — | — | — | Integration termination |
| | 0 | | | | | | | | | | — | — | — | Integration initiation |
| AGC selection (*1) | | 1 | 1 | 1 | | | | | | | — | — | — | Mode 1 |
| | | 1 | 1 | 0 | | | | | | | — | — | — | Mode 2 |
| | | 1 | 0 | 1 | | | | | | | — | — | — | Mode 3 |
| | | 1 | 0 | 0 | | | | | | | — | — | — | Mode 4 |
| | | 0 | 1 | 1 | | | | | | | — | — | — | Mode 5 |
| Output monitor selection | | | | | 1 | 1 | 1 | 1 | 1 | | — | — | — | VREF output |
| | | | | | 1 | 1 | 1 | 1 | 0 | | — | — | — | ISLAND 1–1 |
| | | | | | 1 | 1 | 1 | 0 | 1 | | — | — | — | 1–2 |
| | | | | | 1 | 1 | 1 | 0 | 0 | | — | — | — | 1–3 |
| | | | | | 1 | 1 | 0 | 1 | 1 | | — | — | — | 1–4 |
| | | | | | 1 | 1 | 0 | 1 | 0 | | — | — | — | 2–1 |
| | | | | | 1 | 1 | 0 | 0 | 1 | | — | — | — | 2–2 |
| | | | | | 1 | 1 | 0 | 0 | 0 | | — | — | — | 2–3 |
| | | | | | 1 | 0 | 1 | 1 | 1 | | — | — | — | 2–4 |
| | | | | | 1 | 0 | 1 | 1 | 0 | | — | — | — | 3–1 |
| | | | | | 1 | 0 | 1 | 0 | 1 | | — | — | — | 3–2 |
| | | | | | 1 | 0 | 1 | 0 | 0 | | — | — | — | 3–3 |
| | | | | | 1 | 0 | 0 | 1 | 1 | | — | — | — | 3–4 |
| | | | | | 1 | 0 | 0 | 1 | 0 | | — | — | — | 4–1 |
| | | | | | 1 | 0 | 0 | 0 | 1 | | — | — | — | 4–2 |
| | | | | | 1 | 0 | 0 | 0 | 0 | | — | — | — | 5–1 |
| | | | | | 0 | 1 | 1 | 1 | 1 | | — | — | — | 5–2 |
| | | | | | 0 | 1 | 1 | 1 | 0 | | — | — | — | 6–1 |
| | | | | | 0 | 1 | 1 | 0 | 1 | | — | — | — | 6–2 |
| | | | | | 0 | 1 | 1 | 0 | 0 | | — | — | — | 7–1 |
| | | | | | 0 | 1 | 0 | 1 | 1 | | — | — | — | 7–2 |
| | | | | | 0 | 1 | 0 | 1 | 0 | | — | — | — | 8–1 |
| | | | | | 0 | 1 | 0 | 0 | 1 | | — | — | — | 8–2 |
| | | | | | 0 | 1 | 0 | 0 | 0 | | — | — | — | 9–1 |
| | | | | | 0 | 0 | 1 | 1 | 1 | | — | — | — | 9–2 |
| | | | | | 0 | 0 | 1 | 1 | 0 | | — | — | — | 10–1 |

TABLE 4-continued

| Control code 5 | Control parameter | | | | | | | | | | | | Contents of setting |
|---|---|---|---|---|---|---|---|---|---|---|---|---|---|
| | 4 | 5 | 6 | 7 | 8 | 9 | 10 | 11 | 12 | 13 | 14 | 15 | 16 |
| | | | | | 0 | 0 | 1 | 0 | 1 | — | — | — | 10-2 |
| | | | | | 0 | 0 | 1 | 0 | 0 | — | — | — | AGC black output |
| AGC automatic termination total disabling | | | | | | | | | | 1 | — | — | — |
| | | | | | | | | | | 0 | — | — | — Total disabling |

An integration operation of the CCD focus detection device 61 will be described with reference to a timing chart of the entire sequence shown in FIG. 6.

(a) The level of a communication setting selection pulse output from the port IST falls to a low level. After a predetermined period of time, the communication setting selection pulse rises to a high level. While the level of the communication selection pulse is low, communication data is input to the port DATA in synchronization with a communication CK pulse input from the port RST. In this case, communication data (the control code number 7) for resetting the logic of the CCD focus detection device 61 is input. In response to the communication data, the control circuit 71 resets the logic and sweeps the charges accumulated in each of the line sensors I at high speed.

(b) While the communication setting selection pulse at the port IST is at a low level, the control circuit 71 inputs the communication data (the control code number 7) for standard setting of the logic to the port DATA. The control circuit 71, to which the communication data (the control code number 7) has been input, returns the logic to standard setting.

(c) The process for the control parameters of the control code number 1 or 2 is set prior to the initiation of integration as needed. Specifically, for example, the auto gain controller AGC (the monitor sensor M) for disabling the AGC automatic termination specified by the control parameter is set.

(d) While the communication setting selection pulse at the port IST is at a low level, communication data for integration initiation (the control code number 5) is received. The control circuit 71, which has received the communication data (the control code number 5), resets the monitor sensor M corresponding to the specified one of the MODE 1 to-MODE 5. Thereafter, the control circuit 71 rises the port SP to a high level so that the line sensor I starts integration. At the same time, the control circuit 71 transmits the initiation of integration to the main CPU 31. In the illustrated embodiment, all the line sensors I are operated to perform the integration.

(e) When the level of the port IST rises to high, the level of the port TINT also rises to high. When the integration is started, the level of a monitor signal (output voltage) of the monitor sensor M, which is alternatively output from the port VOUT, also rises with elapse of time.

When any of the monitor sensors M, for which AGC automatic termination disabling is not set, reaches a predetermined threshold value, the integration OR signal (the first termination signal) at a low level is output from the control circuit 71 via the selection circuit 73 through the port TINT to the port SI of the main CPU 31.

(f) When the integration OR signal (the first termination signal) is input from the port SI to the main CPU 31, the main CPU 31 outputs the chip enable signal from the port CE to the port IST of the CCD focus detection device 61. In response to the chip enable signal being input, the control circuit 71 of the CCD focus detection device 61 latches integration information of the monitor signal of the monitor sensor M so as to output the integration information as an SOUT signal from the output selection circuit 73. A signal identifying an integration termination state of the monitor sensor M is at a high level for the monitor sensor M which is undergoing the integration, whereas the signal is at a low level for the monitor sensor M for which the integration is completed.

(g) When the output voltages of all the monitor sensors M (for which the AGC automatic termination is not disabled) reach a predetermined threshold value, the integration AND signal is output from the selection circuit 74.

(h) Thereafter, any of the line sensors is selected from the line sensors for which the AGC automatic termination is not disabled, i.e., the line sensors I1, I2, I3 and I4 to I10 to be used.

(i) In synchronization with the rise of the port IST signal, any of the selected line sensors I1, I2, I3 and I4 to I10 starts to be read out so that an image signal is output from the output selection circuit 70 as a VOUT signal. Thereafter, an A/D synchronizing signal is output from the port SP through the selection circuit 74. The main CPU 31 performs A/D conversion on the input VOUT signal in synchronization with the A/D synchronizing signal.

Subsequently, the operations (h) and (i) described above are executed in an arbitrary order for all the line sensors to be used among the line sensors I1, I2, I3 and I4 to I10. When all the reading-out is terminated, the CCD control is completed.

Figure 7:
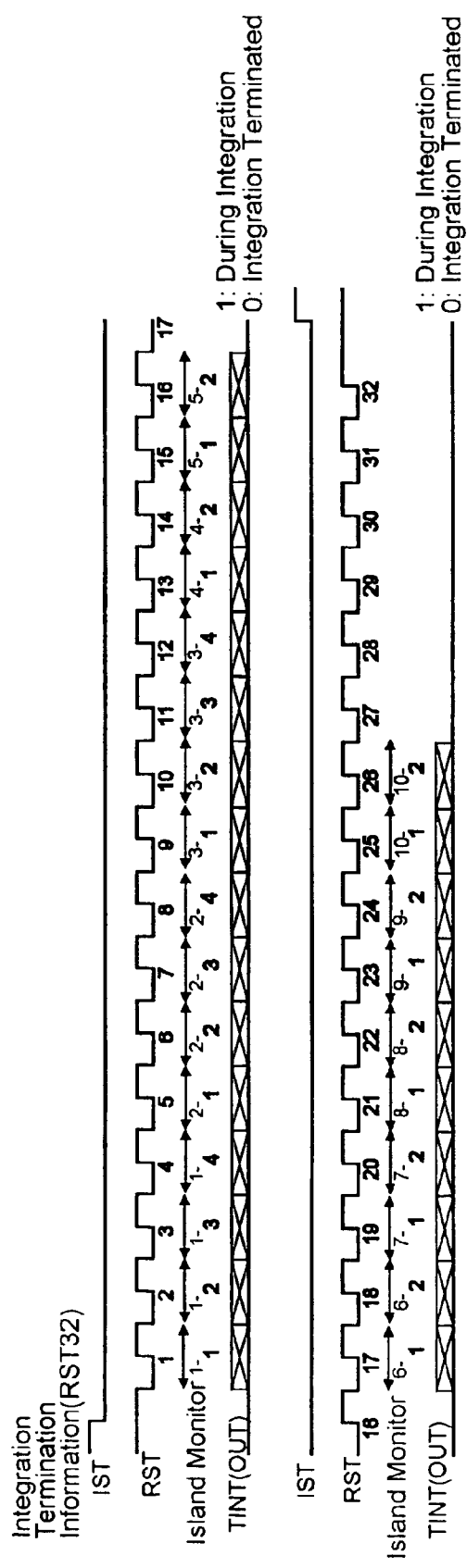
FIG. 7 is a timing chart showing the operation of integration termination of the CCD focus detection device, according to the present invention.

FIG. 7 is a timing chart showing a process in which the main CPU 31 inputs the integration termination information of each of the monitor sensors M in the above step (f). When an output of any of the monitor sensors M reaches a predetermined threshold value, the control circuit 71 outputs the integration OR signal (at a low level) via the selection circuit 73 from the port TINT. When the integration OR signal is input to the port SI, the main CPU 31 drops the level of the port CE to a low level so as to drop the level of the port IST of the control circuit 71 to a low level. As a result, each time a pulse is input to the port RST, the control circuit 71 sequentially outputs the integration termination information of each of the monitor sensors M from the port TINT via the selection circuit 73. In the illustrated example, the integration termination information is output in the order of the monitor sensors M corresponding to the line sensors I1-1 to I1-4, I2-1 to I2-4, to I10-1 and I10-2.

Since the main CPU 31 can first detect that the output of the monitor sensor M has reached a threshold value through the communication from the control circuit 71, the main CPU 31 is not constrained until the main CPU 31 starts communicating with the control circuit 71. Moreover, even in the case where brightness of the object is so high that the output of the monitor sensor M reaches a threshold value within an extremely short period of time, the outputs of the respective monitor sensors M are detected in parallel according to the logic of the control circuit 71 in the CCD focus detection device 61. Therefore, the outputs of all the monitor sensors M can be precisely detected so as to obtain precise integration termination information for the respective corresponding line sensors I.

In addition, in the illustrated embodiment, since these integration termination information can be input through the communication between the same ports TINT and SI, the ports can be efficiently used.

Examples of patterns of use for the line sensors I and the monitor sensors M in the CCD focus detection device 61 will be herein described. Table 5 shows an example of the correspondence between the line sensors I and the monitor sensors M used in the respective MODE 1 to MODE 5. In Table 5, "ALL" means that all the four monitor sensors (M1-1 to M1-4) to (M3-1 to M3-4) are effective in the horizontal line sensors I1 to I3, while one of the two monitor sensors (M4-1, M4-1) to (M10-1 to M10-2), for which the integration is first terminated, is effective in the longitudinal line sensors I4 to I10. Although in Table 5 the line sensors I grouped in blocks (e.g., block 1 (I1~I3)) and designated as "Mx" (x=1~4 in Table 5), each of the line sensors I1~I10 can be alternatively designated.

TABLE 5

Horizontal Sensor

| | Standard Block (ST) | | | | Reference Block (ST) | | | |
|---|---|---|---|---|---|---|---|---|
| | Block 1 | Block 2 | Block 3 | Block 4 | Block 1 | Block 2 | Block 3 | Block 4 |
| Mode 1 | M1 | M2 | M3 | M3 | M1 | M1 | M2 | M3 |
| Mode 2 | M2 | M2 | M3 | M3 | M2 | M2 | M3 | M3 |
| Mode 3 | ALL | M2 | M3 | M4 | M2 | M3 | M4 | ALL |
| Mode 4 | ALL | ALL | M3 | M4 | M3 | M4 | ALL | ALL |
| Mode 5 | ALL | ALL | ALL | ALL | ALL | ALL | ALL | ALL |

Longitudinal Sensor

| | Standard Block (ST) | | Reference Block (ST) | |
|---|---|---|---|---|
| | Block 1 | Block 2 | Block 1 | Block 2 |
| Mode 1 | M1 | M2 | M1 | M2 |
| Mode 2 | M2 | M2 | M2 | M2 |
| Mode 3 | ALL | ALL | ALL | ALL |
| Mode 4 | ALL | ALL | ALL | ALL |
| Mode 5 | ALL | ALL | ALL | ALL |

Figure 10:
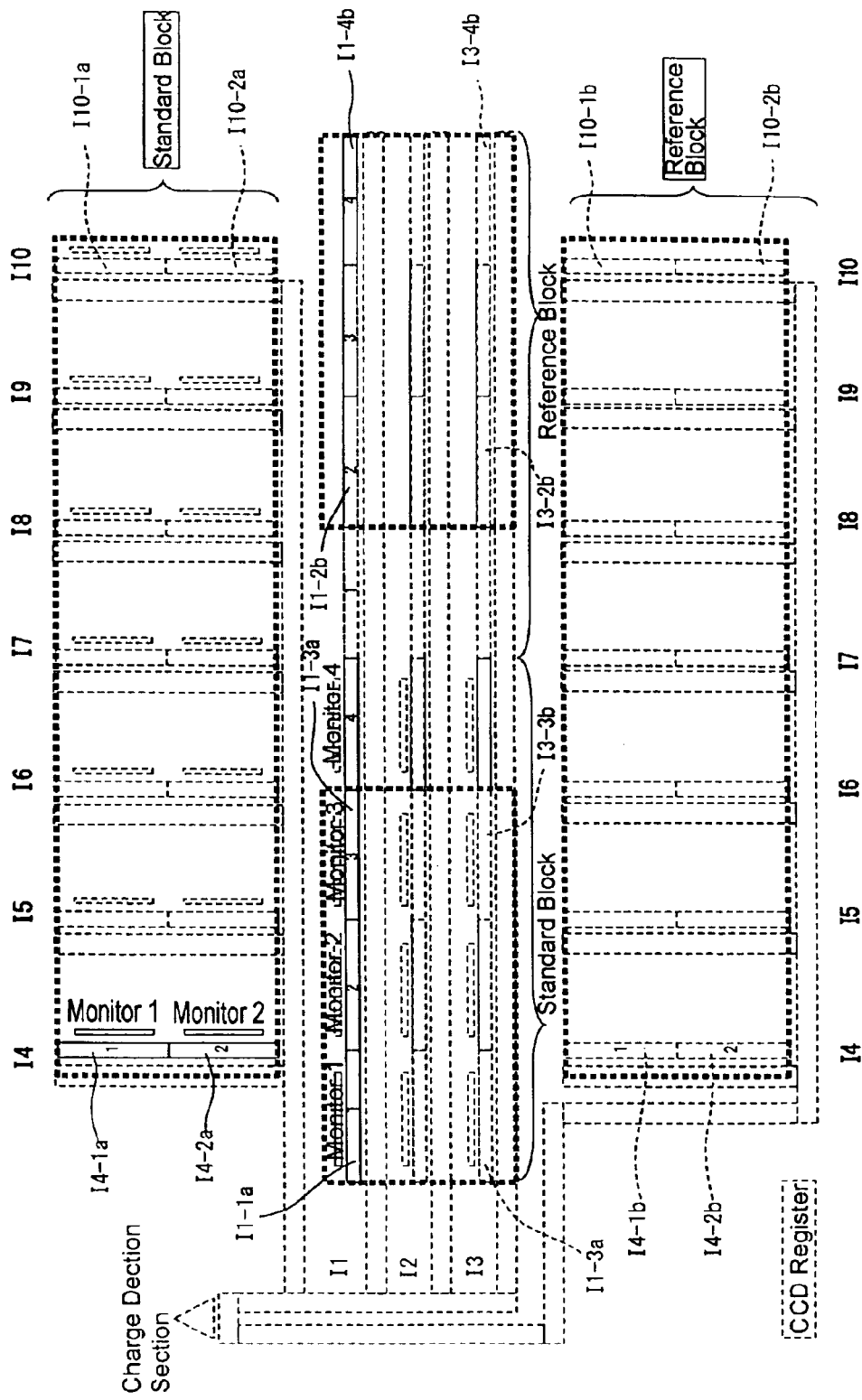
FIG. 10 shows a first example of use of the line sensors and monitor sensors in the CCD focus detection device according to the present invention.
Figure 11:
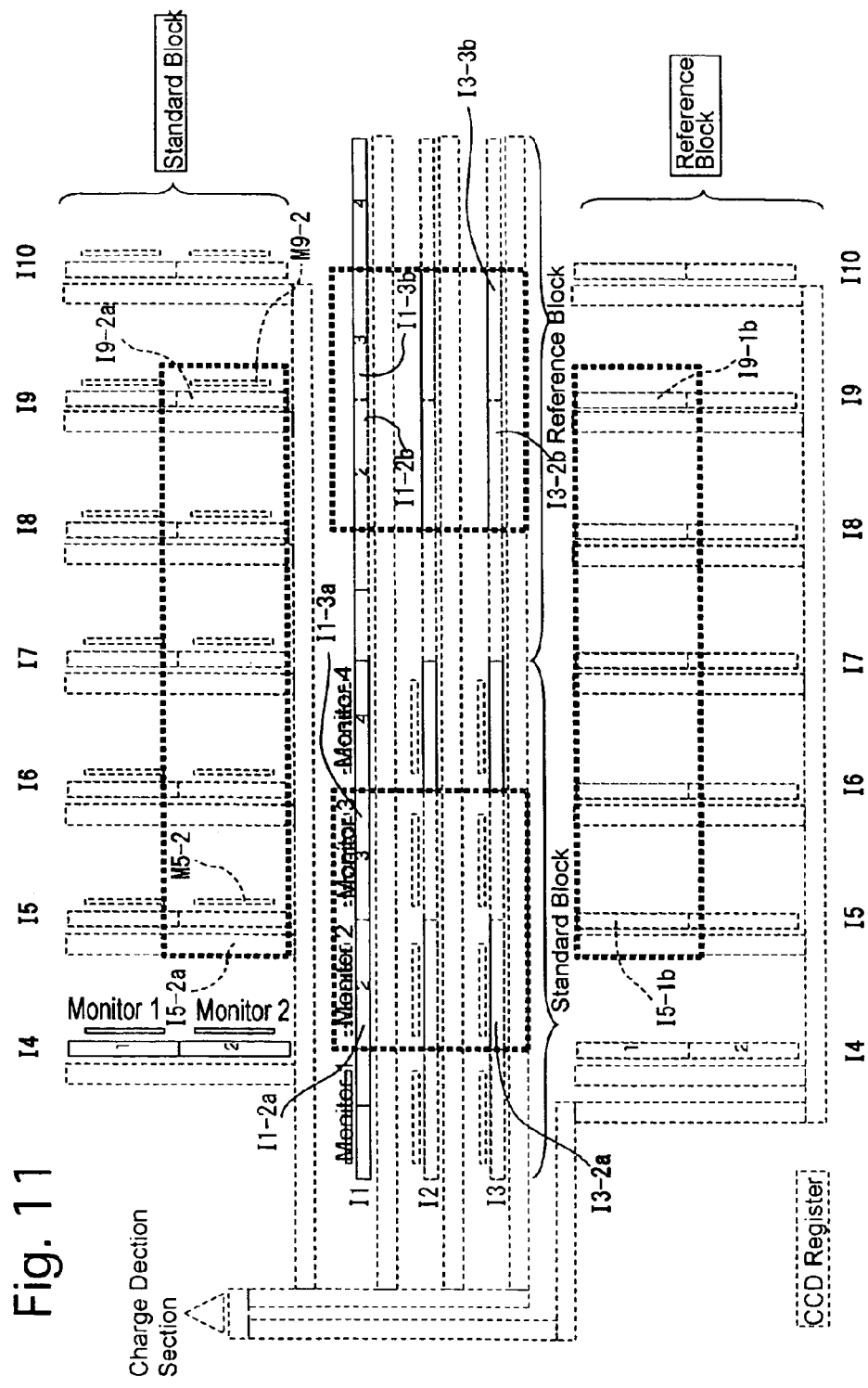
FIG. 11 shows a second example of use of the line sensors and the monitor sensors in the CCD focus detection device according to the present invention.
Figure 12:
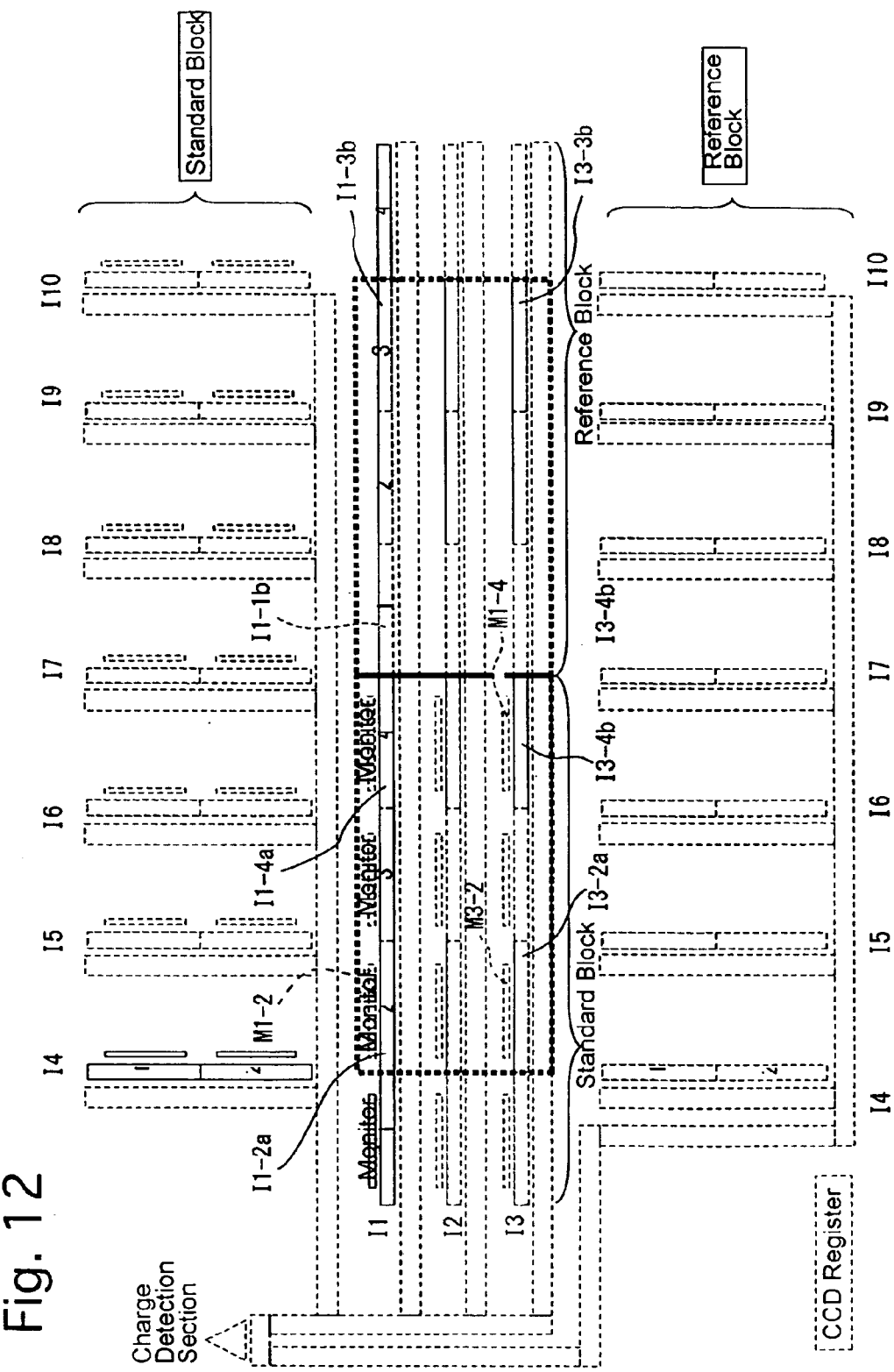
FIG. 12 shows a third example of use of the line sensors and the monitor sensors in the CCD focus detection device according to the present invention.

FIGS. 10 to 12 show patterns of use of the line sensors I and the monitor sensors M in the CCD focus detection device 61, which are for use in MODE 1 through MODE 3. In FIGS. 10 to 12, an area surrounded by a bold broken line corresponds to a used block.

In Table 5, for example, a monitor sensor which is not used in block 4 in Mode 1 is designated as "M3". However, depending on the AF optical system, the sensor areas are not designated like those shown by the bold broken lines in FIG. 10, but rather a portion of the line sensor I1-4a can be used. In this case, it is assumed that the line sensor I1-3a, so that the monitor sensor M3 which corresponds to the line sensor I1-3a is also used.

FIG. 10 shows a MODE 1 pattern corresponding to the MODE 1. In the MODE 1 pattern, for three horizontal line sensors I1 to I3, the first to the third blocks, i.e., the horizontal line sensor standard areas (I1-1a to I1-3a) to (I3-1a to I3-3a) are used as the standard blocks, whereas the second to fourth blocks, i.e., the horizontal line sensor reference areas (I1-2b to I1-4b) to (I3-2b to I3-4b) are used as the reference blocks. Three monitor sensors (M1-1 to M1-3) to (M3-1 to M3-3) corresponding to the respective areas are used. In the seven longitudinal line sensors I4 to I10, all the areas (the first and the second areas), i.e., the longitudinal line sensor standard areas (I4-1a, I4-2a) to (I10-1a, I10-2a), and the longitudinal line sensor reference areas (I4-1b, I4-2b) to (I10-1b, I10-2b) are used. Correspondingly, all the monitor sensors (M4-1, M4-2) to (M10-1, M10-2) corresponding to all the areas are used.

This MODE 1 pattern is suitable for optical systems requiring highly accurate focus detection or relatively large optical systems.

FIG. 11 shows a MODE 2 pattern corresponding to the MODE 2. In the MODE 2 pattern, for three horizontal line sensors I1 to I3, the second and the third blocks, i.e., the horizontal line sensor standard areas (I1-2a, I1-3a) to (I3-2a, I3-3a) and the horizontal line sensor reference areas (I1-2b, I1-3b) to (I3-2b, I3-3b) are respectively used. In the monitor sensors M, two monitor sensors (M1-2, M1-3) to (M3-2, M3-3) corresponding to the second and the third areas are used. In the seven longitudinal line sensors I4 to I10, the second areas closer to the center, i.e., the longitudinal line sensor standard areas (I5-2a) to (I9-2a), and the longitudinal line sensor reference areas (I5-1b) to (I9-1b) of five longitudinal line sensors I5 to I9 excluding two line sensors at both ends are used. Correspondingly, the second monitor sensors M5-2 to M9-2 are used.

This MODE 2 pattern is suitable for middle-sized and small optical systems.

FIG. 12 shows a MODE 3 pattern corresponding to the MODE 3. In this MODE 3 pattern, in the three horizontal line sensors I1 to I3, the second to the fourth standard blocks, i.e., the horizontal line sensor standard areas (I1-2a, I1-4a) to (I3-2a, I3-4a) are used, whereas the first to the third reference blocks, i.e., the horizontal line sensor reference areas (I1-1b, I1-3b) to (I3-1b, I3-3b) are used. In the monitor sensors M, three monitor sensors (M1-2 to M1-4) to (M3-2 to M3-4) corresponding to the respective areas are used. None of the seven longitudinal line sensors I4 to I10 and the seven monitor sensors M4 to M10 are used.

This MODE 3 pattern is suitable for small optical systems.

The above-described patterns of use are merely examples; patterns of use can be arranged in accordance with various optical systems, such as patterns of use corresponding to MODE 4 and MODE 5.

Figure 8:
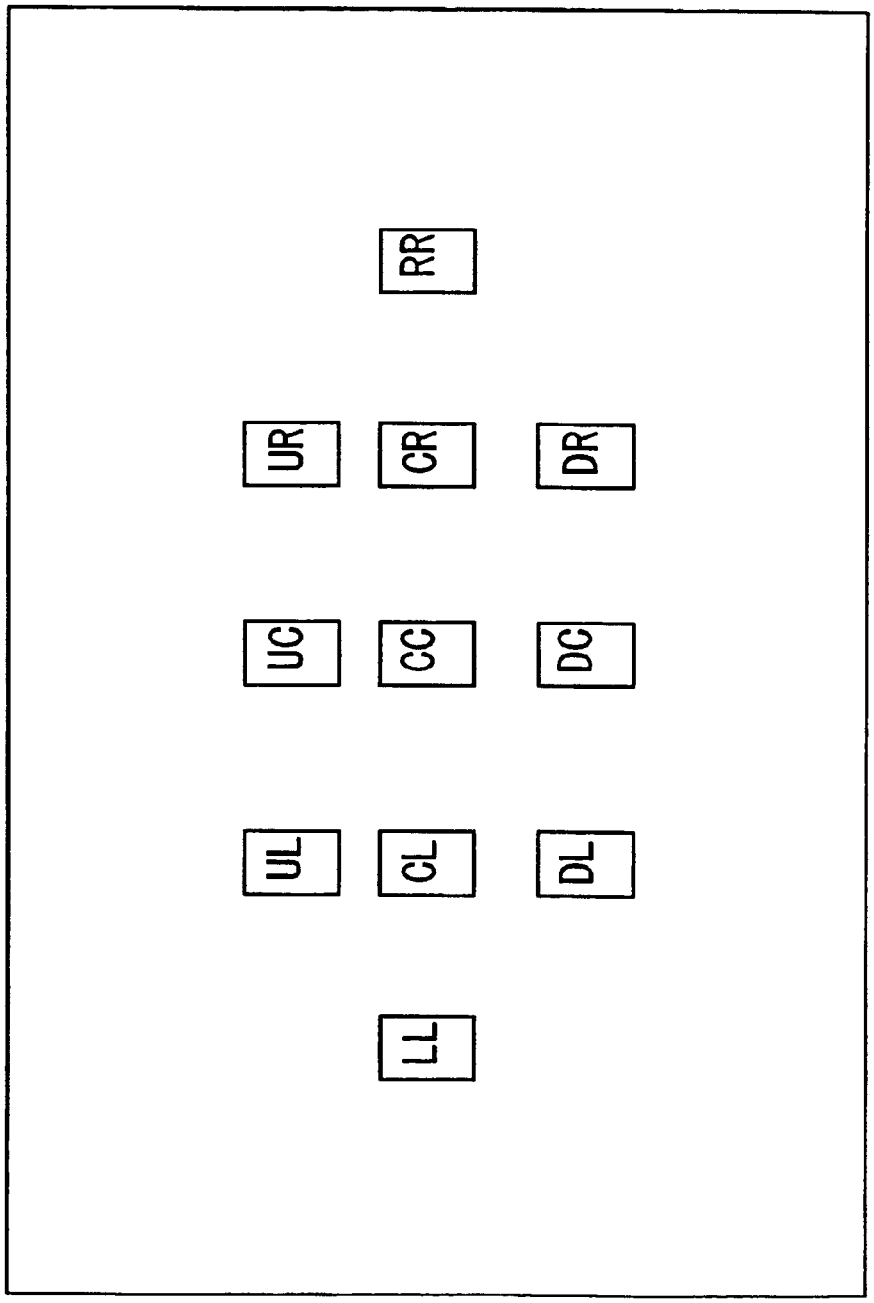
FIG. 8 is a view showing an example of focus detection areas on a finder image of a focus detection device of a single-lens reflex camera using the CCD focus detection device of the present invention.
Figure 9:
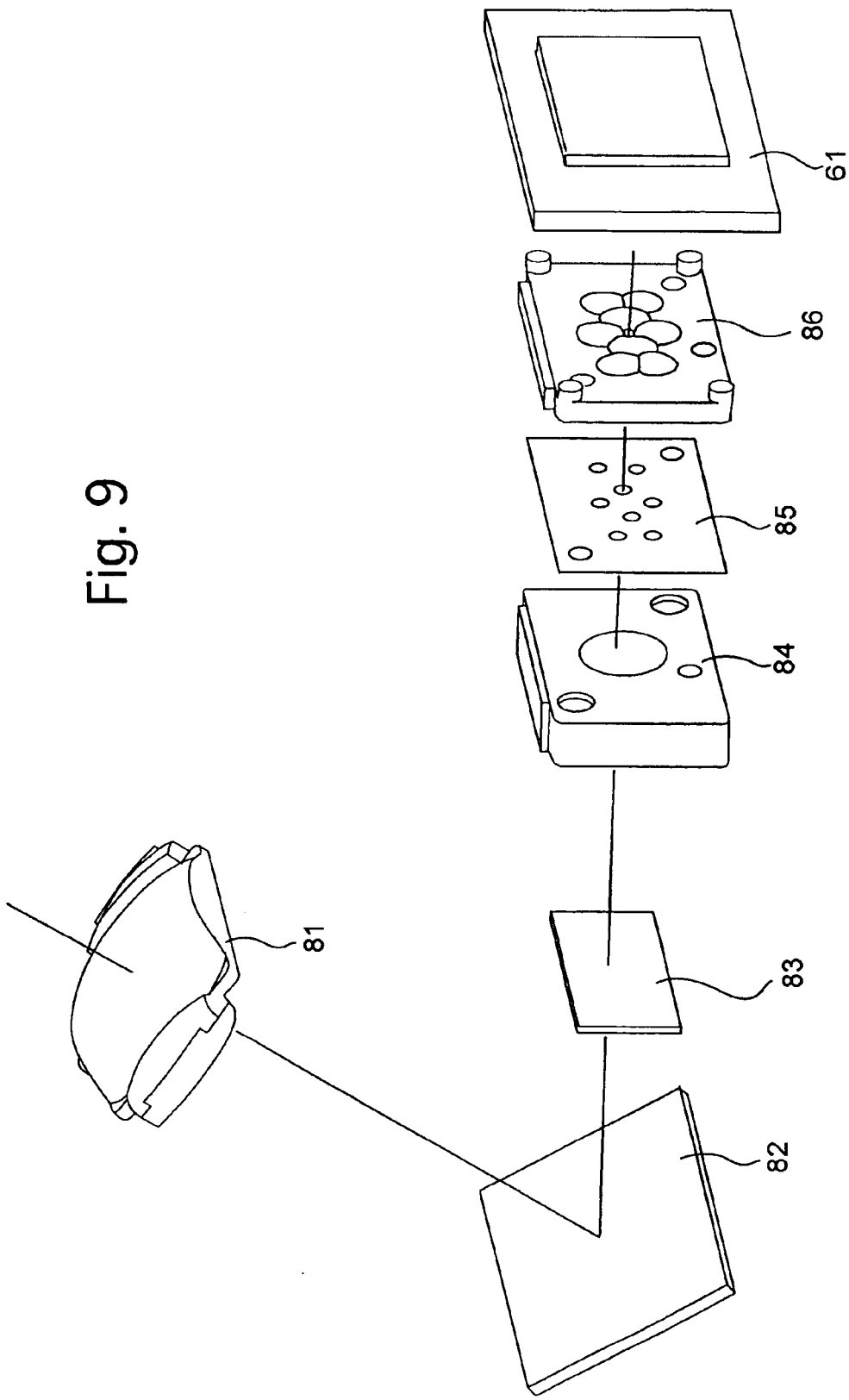
FIG. 9 is a view showing an example of an AF optical system of a single-lens reflex camera using the CCD focus detection device of the present invention.

FIG. 8 shows an example of focus detection areas on a field of view of the finder, which corresponds to the above-described MODE 1 pattern. FIG. 9 shows an example of the AF optical system.

The object light bundle, which is reflected by the sub-mirror 15 toward the AF sensor unit 60, is condensed through a condenser lens 81. After an optical path of the object light bundle is deflected by a mirror 82 in a direction approximately parallel to an optical axis of the photographic lens, the object light bundle passes through an infrared block filter 83 and a supplementary lens 84. The object light bundle passes through a pair of openings in a separator mask 85, which are provided so as to correspond to the respective focus detection areas, so as to be separated thereby. Subsequently, the separated light bundles project an object image on the line sensors I of the CCD focus detection device 61 through the respective lenses of a separator lens 86.

Figure 13:
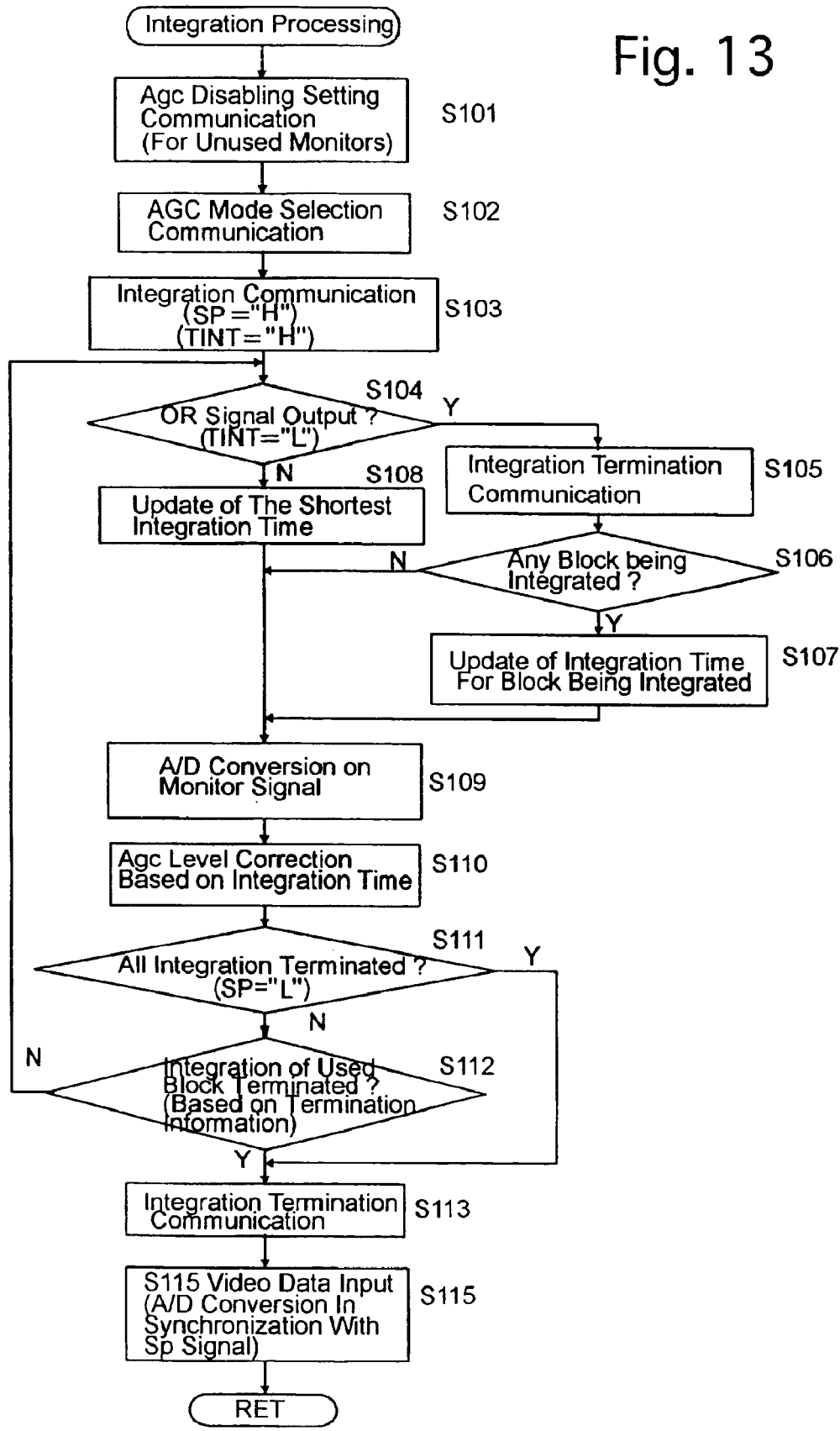
FIG. 13 is a flowchart showing an integration process of the CCD focus detection device, according to the present invention.

The integration process, which is executed by the main CPU 31 with the control circuit 71 of the CCD focus detection device 61, will be described with reference to a flowchart shown in FIG. 13 and the timing charts shown in FIGS. 6 and 7. The main CPU 31 drops the level of the port IST to low to output the chip enable signal CE so as to allow communication, thereby controlling the integrating process.

At the start of the integrating process, the main CUP 31 first performs AGC disabling communication of the monitor sensors M corresponding to the AGC automatic termination disabling settings 1 and 2 of the control code numbers 1 and 2 (step S101) so as to allow AGC mode selection communication (step S102). In the illustrated embodiment, the AGC mode is set to be selectable from five AGC modes: MODE 1 to MODE 5. Among these AGC modes, the patterns of the line sensors I, corresponding to MODE 1 to MODE 3 are as shown in FIGS. 10 to 12.

Thereafter, integration initiation communication is executed. During the integration initiation communication, the level of each of the port SP and the port TINT rises to high (step S103). As a result of this process, the monitoring of the monitor sensors M and the integration of the line sensors I start.

Subsequently, it is checked whether the integration OR signal has been output or not (whether the level of the port TINT has been dropped to low), specifically, whether an output signal of any of the monitor sensors M has reached a predetermined threshold value or not (step S104). If the integration OR signal has not been output (step S104; N), control proceeds to step S109 after the shortest integration time is updated (steps S108 and S109).

If the integration OR signal has been output (step S104; Y), integration termination information communication is executed (step S105) so as to check whether any of the used blocks (line sensors I) is currently being integrated or not (step S106). Herein, the "used block" refers to a block including the line sensor I on which the AGC automatic termination disabling is not performed.

If any of the blocks are being integrated (step S106; Y), the integration time of the block being integrated is updated so that control proceeds to step S109 (steps S107 and S109), otherwise control proceeds to step S109 (steps S106, N; S109).

The process at steps S104 through S108 described above is for measuring the integration time. The measured integration time is subject to logarithmic compression so as to be used for AGC level correction.

At step S109, a monitor signal is subjected to A/D conversion. Thereafter, in accordance with the integration time, the monitor signal is subjected to AGC level correction (step S110). The AGC level correction is for keeping an output voltage at the end of integration constant, regardless of the amount of integration time.

Thereafter, it is checked whether the integration is terminated for all the line sensors I or not, i.e., whether the level of the port SP drops to a low level so that the integration AND signal is output or not (step S111). If the integration is not terminated for all the line sensors I (step S111; N), it is then checked whether the integration for the used blocks (the line sensors corresponding to the MODE number) is terminated or not based on the termination information (step S112). If the integration for the used blocks is not terminated (step S112; N), control returns to step S104 so as to repeat the process at steps S104 through S111 and step S112.

If the integration for all the line sensors I is terminated (step S111; Y) or the integration for all the used blocks is terminated (steps S111, N; S112, Y), the integration termination communication is executed (step S113) so as to input the VOUT signal (Video data). Thereafter, the VOUT signal is subjected to A/D conversion in synchronization with the port SP signal to terminate the process (step S115; RET).

This integration process is repeatedly executed for each predetermined time.

Figure 15A:
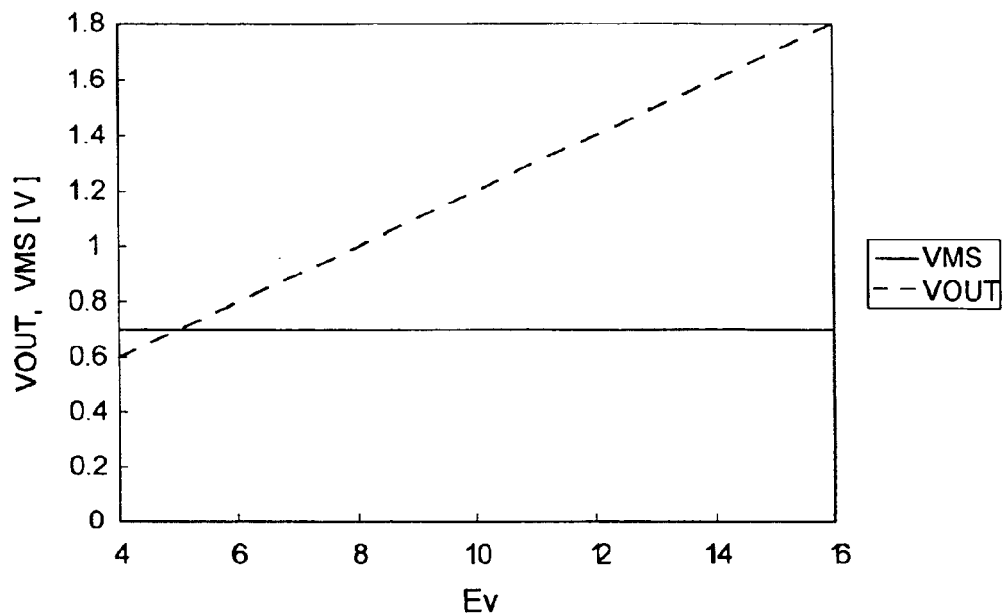
FIG. 15A is a graph showing the relation between the brightness of a photographic object and an output voltage of the CCD focus detection device before AGC level correction.
Figure 15B:
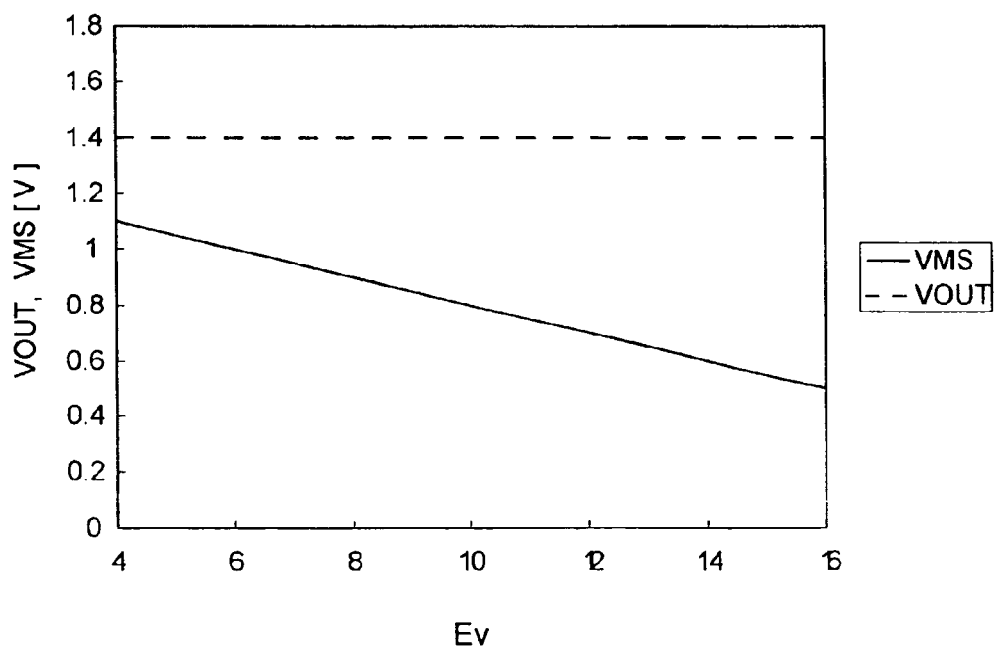
FIG. 15B is a graph showing the relation between the brightness of a photographic object and an output voltage of the CCD focus detection device after AGC level correction.

FIGS. 15A and 15B are graphs showing the relation between the VOUT signal and the VMS signal. The abscissa axis of each graph represents an equivalent value Ev to apex display of the brightness of an object, whereas the ordinate axis represents a VOUT signal.

The VMS signal is adjusted so that an integrated value of the line sensor I becomes a predetermined integrated value (so that an amplified VOUT signal becomes a predetermined value in the illustrated embodiment) when the monitor signal output from the monitor sensor M at the standard object brightness reaches a predetermined integration termination value (threshold value). However, the line sensors I and the monitor sensors M are characteristic in that the VOUT signal becomes smaller than a predetermined value as the integration time is prolonged (as the brightness of the object is lowered) (FIG. 15A). Therefore, in the case of high brightness, an integrated value in a high-brightness area is adversely saturated. As a result, a phase difference cannot be precisely measured. On the other hand, in the case of low brightness, a dynamic range of the CCD cannot be efficiently used because the integrated value becomes smaller than an appropriate integrated value. As a result, a contrast cannot be obtained.

In view of this problem, in the present embodiment, the VMS signal serving as a standard level of AGC is corrected (adjusted) so that an appropriate VOUT signal has a predetermined value regardless of the brightness of the object, i.e., regardless of the amount of integration time (FIG. 15B). The above-described step S110 corresponds to a correction process. The AGC level correction process by the integration time correction will be described with reference to the flowchart shown in FIG. 14 and FIGS. 15A and 15B.

In the AGC level correction process, the brightness corresponding to the apex display value (logarithm value) Ev=12 is set as standard brightness. A practical amount of integration time is subjected to logarithmic compression, using the integration termination time of 1 mS (1024 $\mu$S) at the above standard brightness as standard time. In accordance with the amount of time of logarithmic compression, the VMS signal is corrected so that the appropriate VOUT signal becomes constant.

At the start of the AGC level correction process, an AGC standard value is first set (step S201). This standard value is a reference value voltage VMS.

Subsequently, the Ev value corresponding to the apex display value is set to the maximum value, 16 in the illustrated embodiment (step S202). Thereafter, it is checked whether the integration time is equal to 128 $\mu$S or longer (step S203). If the integration time is equal to or longer than 128 $\mu$S (step S203; Y), the integration time is halved (step S204).

Thereafter, after 1 is subtracted from the Ev value, control returns to step S203 (steps S205, S203). The above-described loop process is repeated until the integration time becomes shorter than 128 $\mu$s. As a result of the loop process, the Ev value in accordance with the integration time can be obtained. Since the initial value (the maximum value) of the Ev value is set at 16 in the illustrated embodiment, the Ev value remains to be 16 in the case of high brightness with the integration time of less than 128 μs and the Ev of 16 or more.

If the integration time is less than 128 μs, or has become less than 128 μs due to the process at step S204, (S203; N), a value of Ev' is calculated in accordance with the following Formula (step S206):

(Ev−12)−(remainder of (integration time/64 μS)/64)

According to the above Formula, a difference between the current Ev value, which is set by the process at steps S202 through S205, and the standard Ev value (12) can be obtained. In the above formula, (remainder of (integration time/64 μS)/64) calculates the remaining value which is less than 1 Ev from the loop of steps S203 through S205. In this case, the value is calculated down to 1/8 Ev.

Subsequently, the reference voltage VMS is corrected in accordance with the following Formula (step S207):

VMS−Ev'×correction value

The corrected reference voltage VMS is subjected to D/A conversion so as to be applied to the auto gain controller AGC. Thereafter, control returns (step S209, RET).

As a result of the AGC level correction process, the reference voltage VMS is adjusted so that the output of an appropriate integrated value becomes constant regardless of the brightness of the object. Therefore, the highest output voltage of each line sensor can be prevented from being cut off. Accordingly, the dynamic range of each line sensor can be efficiently used.

Normally, each of the values of the AGC level correction process, for example, the standard value voltage VMS at step S201, the Ev value at step S202, 128 μS at step S203, a factor at step S206, and the like, are preset in accordance with the characteristics of the line sensors I. Subsequently, these values are written to a memory of the EEPROM 38 during manufacture.

As described above, the CCD focus detection device 61 of the present invention includes a plurality of sensor sets, each being composed of line sensors and monitor sensors. The sensor set to be used can be specified by the communication between the main CPU 31 and the control circuit 71 provided for the CCD focus detection device 61. Therefore, the set of line sensors and monitor sensors to be used can be selected in accordance with the specifications of a camera to be included and the specifications of a photographic optical system and a focus detection area. More specifically, a single CCD focus detection device 61 can be used for various types of equipment in conformity with the specifications of equipment to be included.

Furthermore, in the CCD focus detection device 61, each line sensor can be designated with a plurality of sub-areas. Furthermore, a monitor sensor is provided for each area so that the monitor sensor can be controlled for each area. Accordingly, the CCD focus detection device 61 can be used in multiple detailed patterns.

As can be understood from the above description, in the focus detection device according to the present invention, the gain adjustment device, which adjusts a gain level of each of the auto gain controllers in accordance with each integration time during the integration of the line sensor, adjusts the gain level of the auto gain controller so that an appropriate integrated value of the line sensor becomes an approximately predetermined value regardless of the integration time when the monitor signal reaches a predetermined termination value. Accordingly, an approximately constant appropriate integrated value can be obtained from each of the line sensors regardless of the brightness of a photographic subject.

What is claimed is:

1. A focus detection device, comprising:
   a plurality of line sensors, each having a plurality of pixels, wherein each of said line sensors photoelectrically converts and integrates light from an object received by each of the pixels so as to output the received light as an image signal;
   a plurality of monitor sensors provided adjacent to said line sensors, respectively, each of said monitor sensors monitoring an integrated value of said adjacent line sensor;
   a control device which amplifies an output of each of the monitor sensors and outputs the amplified output as a monitor signal, and terminates integration of said line sensor corresponding to said monitor sensor when said monitor signal reaches a predetermined termination value; and
   a gain adjustment device which adjusts a gain level of the control device in accordance with each integration time during integration of the line sensor,
   wherein said gain adjustment device adjusts the gain level of the control device so that an appropriate integrated value of the line sensor becomes an approximately predetermined value when the monitor signal reaches the predetermined termination value regardless of the integration time.

2. The focus detection device according to claim 1, wherein the gain adjustment device comprises a calculation device which uses integration time obtained by performing logarithmic compression on the integration time and a predetermined factor to calculate a gain-level adjustment value.

3. The focus detection device according to claim 1, further comprising a detection device which detects that the amplified monitor signal reaches the predetermined termination value allowing the integration of the line sensor to be terminated after said control device allows said line sensor and said monitor sensor to start the integration.

4. The focus detection device according to claim 3, wherein the control device outputs a first termination signal from a first control output terminal to the gain adjustment device when the detection device detects that the monitor signal of any of the monitor sensors reaches the termination value, and thereafter sequentially outputs integration termination information of the respective monitor sensors from the first control output terminal to the gain adjustment device.

5. The focus detection device according to claim 4, wherein said gain adjustment device measures the integration time based on the integration termination information so as to calculate said gain-level adjustment value.

6. The focus detection device according to claim 5, wherein said gain adjustment device measures the integration time based on the integration termination information output from the first control output terminal.

7. The focus detection device according to claim 1, further comprising said line sensors, said monitor sensors and said control device;
   wherein said gain adjustment device is provided separately from said focus detection device.

8. The focus detection device according to claim 7, wherein said gain adjustment device comprises a control device of a focus detection apparatus, wherein said focus detection device is provided in said focus detection apparatus.

9. The focus detection device according to claim 7, wherein said focus detection device is provided in a camera, and wherein a control device of said camera functions as said gain adjustment device.

* * * * *